United States Patent
Saikia et al.

(10) Patent No.: US 12,141,870 B2
(45) Date of Patent: Nov. 12, 2024

(54) DECENTRALIZED ASSET EXCHANGE HAVING LOW SLIPPAGE USING STABLE AND VOLATILE RATIOS WITH WEIGHTED ASSET ALLOCATION

(71) Applicant: GARLAND YOG LLC, San Ramon, CA (US)

(72) Inventors: Joy Saikia, San Ramon, CA (US); Money Das Saikia, San Ramon, CA (US)

(73) Assignee: Garland Yog LLC, San Ramon, CA (US)

( * ) Notice: Subject to any disclaimer, the term of this patent is extended or adjusted under 35 U.S.C. 154(b) by 0 days.

(21) Appl. No.: 18/594,337

(22) Filed: Mar. 4, 2024

(65) Prior Publication Data

US 2024/0249356 A1    Jul. 25, 2024

Related U.S. Application Data

(63) Continuation of application No. 18/518,291, filed on Nov. 22, 2023.

(60) Provisional application No. 63/427,808, filed on Nov. 23, 2022.

(51) Int. Cl.
*G06Q 40/04* (2012.01)
*G06Q 20/38* (2012.01)

(52) U.S. Cl.
CPC ........... *G06Q 40/04* (2013.01); *G06Q 20/381* (2013.01)

(58) Field of Classification Search
CPC .................. G06Q 40/04; G06Q 20/381
See application file for complete search history.

(56) References Cited

U.S. PATENT DOCUMENTS

| 2022/0076217 A1* | 3/2022 | Han ................... G06Q 20/3827 |
| 2023/0419274 A1* | 12/2023 | Williams ............ G06Q 20/065 |
| 2024/0169434 A1 | 5/2024 | Saikia et al. |

FOREIGN PATENT DOCUMENTS

| WO | WO-2020049442 A1 * | 3/2020 | ............. G06Q 20/06 |
| WO | WO-2022078000 A1 * | 4/2022 | ............. H04L 29/06 |
| WO | WO 2024/112936 | 5/2024 | |

OTHER PUBLICATIONS

Annessi et al.: Improving security for users of decentralized exchanges through multiparty computation, Jun. 21, 2021, Nash Exchange, pp. 1-8 (Year: 2021).*
Lipton et al.: Automated Market-Making (AMM) for Fiat Currencies, Sep. 28, 2021, pp. 1-16 (Year: 2021).*

(Continued)

*Primary Examiner* — Bijendra K Shrestha
(74) *Attorney, Agent, or Firm* — Knobbe Martens Olson & Bear, LLP

(57) ABSTRACT

A decentralized asset exchange technology with technology improvements for low slippage is provided. A method is provided that includes receiving a request to exchange a first amount of a first token for a second token. The first token and the second token have an exchange rate. The method also includes determining a first liquidity amount for the first token, determining a second liquidity amount for the second token, identifying a tangent of a function that is generated using the first liquidity amount, the second liquidity amount, the exchange rate, and a slippage rate, and determining a price of the first amount of the first token based on the tangent.

20 Claims, 10 Drawing Sheets

(56) References Cited

OTHER PUBLICATIONS

Liu et al.: Knowledge Discovery in Cryptocurrency Transactions: A Survey, 2021, IEEE Access, pp. 1-30 (Year: 2021).*
Hu, Kun: Uniswap: Everything You Need to Know, Nov. 4, 2020, New Blockchain, pp. 1-12 (Year: 2020).*
International Search Report and Written Opinion issued in PCT Application No. PCT/US2023/080990, dated Apr. 16, 2024, in 12 pages.
Jensen et al., "The Homogenous Properties of Automated Market Markers", Arxiv.org, Cornell University Library, XP081920775, Mar. 31, 2021.
Milionis et al., "Automated Market Making and Loss-Versus-Rebalancing", Arxiv.org, Cornall University Library, XP091321390, Sep. 22, 2022.
Xu et al., "SoK: Decentralized Exchanges (DEX) with Automated Market Maker (AMM) Protocols", Arxiv.org, Cornell University Library, XP091065699, Oct. 5, 2021.
Lipton et al., "Automated Market-Making for Fiat Currencies", Sep. 28, 2021, in 16 pages.

* cited by examiner

200

201 — $f(x_0,y_0,p_0,f_{factor}) = f_{factor}\sqrt{\dfrac{x_0 y_0}{p_0}}(x_0 p_0 + y_0) - 2x_0 y_0 f_{factor} + x_0 y_0$ $p_0 = \text{Price of asset } x_0 \text{ in terms of } y_0$ 202 — $f(x_0,y_0,p_0,f_{factor}) = f_{factor}\sqrt{(p_0 x_0)y_0}((p_0 x_0) + y_0) - 2f_{factor}(f_{price}(p_0,f_{factor})x_0)y_0$
$+ (f_{price}(p_0,f_{factor})x_0)y_0$ $f_{price}(p_{price},f_{factor}) = $ a conditional function for weight determination $p_0 = \text{Price of asset } x_0 \text{ in terms of } y_0$ 203 — $f_2(x_0,y_0,W_{weight},W_{factor}) = x_0^{W_{weight}} y_0^{W_{factor}} + x_0 y_0$ 204 — $f_{stable}(x_0,y_0,f_{factor}) = f_{factor}\sqrt{x_0 y_0}(x_0 + y_0) - 2x_0 y_0 f_{factor} + x_0 y_0$ 205 — $f_{nonFunction}(x_0,y_0,V) = \text{Constant}$ where V=0 or 1
X0 = Amount of Available Reserve of Token1
Y0 = Amount of Available Reserve of Token2

$f_{nusFunction}(x_0,y_0,V) = x_0 y_0 (1 + y_0^5 + V x_0^5 y_0)$ where V=0 or 1
X0 = Amount of Available Reserve of Token1
Y0 = Amount of Available Reserve of Token2

COST FUNCTIONS FOR USE WITH IMPROVED AMM TECHNOLOGY

*Fig. 2A*

| | |
|---|---|
| Basis for $f_1(x_0, y_0, p, L, w)$ | |
| 252 — $p$ denotes a random rate Of change between any two positive variables $x_0$ and $y_0$ and a rate of deviation among instances of $p$ is denoted with variable $w$. If $w$ associates variables both $x_0$ and $y_0$ with $p$ for retaining an equilibrium, then there exists an identity function satisfying: $f_1(x_0, y_0, pL, w) - C = 0$ where $c$ is an invariant constant. | |
| 254 — $$f_1(x_0, y_0, p, L, w) = Lw\sqrt{\frac{x_0 y_0}{p}(px_0 + y_0) - 2x_0 y_0 Lw + x_0 y_0 w}$$ | Where $x_0$ = Relative Amount of token1, $y_0$ = Relative Amount of token2 $p_0$ = Price of Asset $x_0$ in terms of $y_0$ $L$ = Leverage Parameter, $0 \leq L \leq 1$ $w$ = Dynamic Weight that associate $x_0$ and $y_0$ to change in $p_0$ to retain invariant constant $C$ |
| 256 — When $p = 1$, the identity function can express as following for correlated assets $$f_1(x_0, y_0, L, w) = Lw\sqrt{x_0 y_0}(x_0 + y_0) - 2x_0 y_0 Lw + x_0 y_0 w$$ | |
| 258 — $$f_2(x_0, y_0, W_{weight}, W_{factor}) = x_0 W_{weight} y_0 + x_0 y_0 W_{weight} W_{factor}$$ | Where $x_0$ = Tradable Amount of token1, $y_0$ = Tradable Amount of token2, $W_{factor}$ = Leverage Parameter, $0 \leq L \leq 1$ $W_{weight}$ = Static Weight that associate $x_0$ and $y_0$ to invariant Constant, $C$ |
| 260 — $$f_3(x_0, y_0, W_{factor}) = x_0 y_0 (1 + y_0^{0.5} + W_{factor} x_0^{0.5} y_0)$$ | Where $W_{factor}$ = 1 or 0 $x_0$ = Tradable Amount of token1, $y_0$ = Tradable Amount of token2 |

*Fig. 2B*

| S.No | Liquidity Pools | Pool attributes | remarks |
|---|---|---|---|
| 1 | Stable Coin (1-to-1 Ratio Pool) | Pool with 2 or more Stable Coins | A linear like CFMM defined with P=1 for stable coins and follows a price curve that be updated to transition from linear (A+B) to A*B with help of a Slop parameter (S). Slope (S) is bounded by [0,1]. (The Liquidity Pool can also use as price oracle for stable coin due to its unique invariant) |
| 2 | Stable Coin (1-to-N) Ratio Pool | Pool with 2 Assets (One asset is fixed with a price ratio of N) | A linear like CFMM defined with P=N and follows a price curve that be updated to transition from linear (AN+B) to A*B with help of a Slop parameter (S). Slope (S) is bounded by [0,1]. (The Liquidity Pool can also use as price oracle for the pair due to its unique invariant) |
| 3 | Weighted Volatile Coin pool | Pool with 2 Assets, But defined with a Capital Ratio of half. For example, if it is an ETH-USDT Pool and 1 ETH = $1500, then capital required to add 200 ETH is only $150,000 in contrast to regualr CPMM where 200 ETH x $1500= $300,000 needed. | A non-linear CFMM defined with P= $\Delta y/\Delta x$ and only needs half Capital Ratio. This CFMM reduces impermanent loss significantly. |
| 4 | Weighted Volatile Coin pool | Pool with 2 Assets, But defined with a Capital Ratio of 1/3. For example, if it is an ETH-USDT Pool and 1 ETH = $1500, then capital required to add 200 ETH is only $100,000 rather than regular CPMM where 200 ETH x $1500= $300,000 needed. | A non-linear CFMM defined with P= $\Delta y/\Delta x$ and only needs 1/3 Capital Ratio. This CFMM reduces impermanent loss significantly. |
| 5 | Volatile Coin Pool with Price Oracle | Pool with 2 Assets and defined with synchronized price oracle. | A linear like CFMM defined with P=N and follows a price curve that be updated to transition from linear (AN+B) to $(AN_1+B)$, where $N_1$ is Oracle price post swap and N is price pre swap. Slippage on each swap can be defined with help of a Slop parameter (S). Slope (S) is bounded by [0,1]. The possible slippage can be reduced to near zero with help of scaling the reserves |
| 6 | Initial Coin Offering (ICO) Pool | Pool with 2 Assets (One asset is fixed with a price ratio of N *for a fixed duration*) | A linear like CFMM defined with P=N and follows a price curve that be updated to transition from linear (AN+B) to A*B with help of a Slop parameter (S). Slope (S) is bounded by [0,1]. The initial Coin offering Pools can assign a fixed Ratio swap for a duration, Once the duration is over then the Pool can be updated to follow Constant Product. the update from fixed ratio to Constant Product Based Price curve can automatically get activated or administratively at the end of a duration. |

TYPES OF LIQUIDITY POOLS FOR USE WITH AMM

*Fig. 5*

DECENTRALIZED ASSET EXCHANGE HAVING LOW SLIPPAGE USING STABLE AND VOLATILE RATIOS WITH WEIGHTED ASSET ALLOCATION

CROSS-REFERENCE TO RELATED APPLICATIONS

This application is a continuation of U.S. patent application Ser. No. 18/518,291, filed Nov. 22, 2023, which claims priority under 35 U.S.C. § 119(e) to U.S. Provisional Patent Application No. 63/427,808, entitled "DECENTRALIZED ASSET EXCHANGE HAVING LOW SLIPPAGE USING STABLE AND VOLATILE RATIOS WITH WEIGHTED ASSET ALLOCATION" and filed on Nov. 23, 2022, the entire disclosure of which is hereby incorporated by reference herein. Any and all applications, if any, for which a foreign or domestic priority claim is identified in the Application Data Sheet of the present application are hereby incorporated by reference in their entireties under 37 C.F.R. § 1.57.

TECHNICAL FIELD

The present disclosure relates generally to asset exchange technology, and more specifically, for a decentralized asset exchange technology with technology improvements for low slippage.

BACKGROUND

Stock markets include various centralized exchanges. A centralized exchange requires traders to trust an operator to safeguard user funds, provide accurate price information, match buyers and sellers to process trades, and settle transactions. While centralized exchanges can trade digital assets used in decentralized financial services, they are themselves custodial and neither trust-minimized nor programmable.

A blockchain is a distributed ledger that can be used to record transactions and reduce the likelihood that recorded transactions are altered retroactively. Generally, a blockchain can be implemented within a peer-to-peer network. Computing devices participating in the peer-to-peer network can each include a copy of the blockchain and broadcast transactions to other computing devices participating in the peer-to-peer network.

The blockchain itself can include a chain of blocks that are linked together cryptographically, with each block in the chain storing one or more transactions and the number of blocks in the chain growing over time. For example, a transaction can include a cryptocurrency payment, execution of a smart contract, and/or any other type of exchange or event. The blocks can be linked together using a cryptographic hash. For example, each block can include a cryptographic hash of a previous block in the chain. Because each block includes a cryptographic hash of a previous block in the chain, a transaction stored in one block cannot be altered without all subsequent blocks being altered as well. The likelihood that all subsequent blocks being altered is low given that such an alteration would require approval from a majority of the computing devices or participants participating in the blockchain.

SUMMARY

The systems, methods, and devices described herein each have several aspects, no single one of which is solely responsible for its desirable attributes. Without limiting the scope of this disclosure, several non-limiting features will now be discussed briefly.

In various embodiments, a decentralized asset exchange technology is disclosed that provides technology improvements for autonomously handling conversion between decentralized assets with stable ratio with a low slippage point and decentralized assets with volatile ratio with weighted asset allocation.

In one embodiment, the technology improvements utilize a novel cost function processor to maintain definitions between decentralized assets, so that the asset's exchange rate continuously and automatically adjusts to the appropriate price and ratio.

In an aspect, the technological improvements relate to a blockchain-based technical field of automated decentralized asset exchange. The technology integrates blockchain functions to allow decentralized storage of all needed information for the asset exchange process for decentralized assets with stable ratio and with decentralized assets with volatile ratio, autonomously.

The technology improvements comprise an automated market maker (AMM), novel invariant cost functions, a liquidity provider incentive process, and a control process in communication with price feeds (Price Oracles) for maintaining system operations. The control process also provides an asset recovery routine.

One aspect of the disclosure provides a method that includes receiving a request to exchange a first amount of a first token for a second token. The first token and the second token have an exchange rate. The method also includes determining a first liquidity amount for the first token, determining a second liquidity amount for the second token, identifying a tangent of a function that is generated using the first liquidity amount, the second liquidity amount, the exchange rate, and a slippage rate, and determining a price of the first amount of the first token based on the tangent.

Another aspect of the disclosure provides an AMM that comprises a first interface that receives a request to exchange a first amount of a first token for a second token. The first token and the second token have an exchange rate. The AMM also comprises a second interface that determines a first liquidity amount for the first token and a second liquidity amount for the second token, and a processor that identifies a tangent of a function using the first liquidity amount, the second liquidity amount, the exchange rate, and a slippage rate. The processor determines a price of the first amount of the first token based on the tangent.

One aspect of the disclosure provides a computer-implemented method. The computer-implemented method comprising: under control of a computing device in a decentralized network, receiving a request to exchange a first amount of a first token for a second token, where the first token and the second token have an exchange rate, determining a first liquidity amount for the first token, determining a second liquidity amount for the second token, calculating a solution of a function that is generated using the first liquidity amount, the second liquidity amount, the exchange rate, and a slippage rate, and determining a price of the first amount of the first token based on the solution.

The computer-implemented method of the preceding paragraph can include any sub-combination of the following features: where calculating the solution further comprises causing the computing device to execute a non-recursive function, and calculating a relative reserve with the non-recursive function, exchanging the first amount of the first token for the second token, and validating the relative reserve with the non-recursive function; where the non-recursive function executes with a constant cost; where the non-recursive function executes deterministically; where the non-recursive function comprises a Newton-Raphson function; where the non-recursive function is configured to prevent precision loss; where the first liquidity amount and second liquidity amount are based on actual reserves; where the first liquidity amount and second liquidity amount are virtual reserves not based on actual reserves; where the price determined based on the solution reduces slippage; where the function is expressed as:

$$f_{AMM}(x, y, p, s, w) = sw\sqrt{\frac{xy}{p}}(px+y) - 2xysw + xyw$$

where x is a relative amount of a first asset, y is a relative amount of a second asset, p is a price of the first asset in terms of the second asset, s is a leverage parameter, and w is a dynamic weight; where the function is expressed as:

$$f(t_1, t_2, r, c) = c*\sqrt{\frac{t_1 t_2}{p}}(t_1 p + t_2) - 2t_1 t_2 c + t_1 t_2,$$

where $t_1$ indicates available liquidity of the first token, where $t_2$ indicates available liquidity of the second token, where r is the exchange rate between the first token and the second token, where c is the slippage rate, and where if no exchange rate r is known then the exchange rate r is set to one; where the function is expressed as:

$$f_2(x_0, y_0, W_{weight}, W_{factor}) = x_0^{W_{weight}} y_0 + x_0 y_0^{W_{factor} W_{weight}};$$

where the function is expressed as:

$$f_{newFunction}(x_0, y_0, V) = x_0 y_0 (1 + y_0^{0.5} + V x_0^{0.5} y_0);$$

where using the solution to determine the price is configured to result in the exchange rate remaining within a threshold; where the computer-implemented method is performed by an Automated Market Maker (AMM); where the solution is determined using an iterative process; where the iterative process involves a Newton-Raphson method.

Another aspect of the disclosure provides an Automated Market Maker (AMM). The AMM comprising a network interface configured to couple a computing device to a decentralized network, a hardware processor, and a non-transitory computer readable storage medium storing program instructions for execution by the hardware processor in order to cause the computing device to receive a request to exchange a first amount of a first token for a second token, where the first token and the second token have an exchange rate, determine a first liquidity amount for the first token, determine a second liquidity amount for the second token, calculating a solution of a function that is generated using the first liquidity amount, the second liquidity amount, the exchange rate, and a slippage rate, and determine a price of the first amount of the first token based on the solution.

The AMM of the preceding paragraph can include any sub-combination of the following features where the program instructions, when executed, further cause the computing device to cause the computing device to execute a non-recursive function, and calculate a relative reserve with the non-recursive function; where the program instructions, when executed, further cause the computing device to exchange the first amount of the first token for the second token, and validate the relative reserve with the non-recursive function; where the non-recursive function executes with a constant cost; where the non-recursive function executes deterministically; where the non-recursive function comprises a Newton-Raphson function; where the non-recursive function is configured to prevent precision loss; where the function is expressed as:

$$f_{AMM}(x, y, p, s, w) = sw\sqrt{\frac{xy}{p}}(px+y) - 2xysw + xyw$$

where x is a relative amount of a first asset, y is a relative amount of a second asset, p is a price of the first asset in terms of the second asset, s is a leverage parameter, and w is a dynamic weight; where the function is expressed as:

$$f(t_1, t_2, r, c) = c*\sqrt{\frac{t_1 t_2}{p}}(t_1 p + t_2) - 2t_1 t_2 c + t_1 t_2,$$

where $t_1$ indicates available liquidity of the first token, where $t_2$ indicates available liquidity of the second token, where r is the exchange rate between the first token and the second token, and where c is the slippage rate; where the function is expressed as:

$$f_2(x_0, y_0, W_{weight}, W_{factor}) = x_0^{W_{weight}} y_0 + x_0 y_0^{W_{factor} W_{weight}};$$

where the function is expressed as:

$$f_{newFunction}(x_0, y_0, V) = x_0 y_0 (1 + y_0^{0.5} + V x_0^{0.5} y_0);$$

where the hardware processor uses the solution to determine the price is configured to result in the exchange rate remaining within a threshold; where the hardware processor determines the solution using an iterative process; where the hardware processor performs the iterative process using a Newton-Raphson method.

Another aspect of the disclosure provides non transitory, computer-readable storage media comprising computer-executable instructions for exchanging cryptocurrency, where the computer-executable instructions, when executed by a computer system, cause the computer system to receive a request to exchange a first amount of a first token for a second token, where the first token and the second token have an exchange rate, determine a first liquidity amount for the first token, determine a second liquidity amount for the second token, calculate a solution of a function that is generated using the first liquidity amount, the second liquidity amount, the exchange rate, and a slippage rate, and use the solution to determine a price of the first amount of the first token.

The non-transitory, computer-readable storage media of the preceding paragraph can include any sub-combination of the following features where the computer-executable instructions, when executed, further cause the computer system to cause the computer system to execute a non-recursive function, and calculate a relative reserve with the non-recursive function; where the computer-executable instructions, when executed, further cause the computer system to exchange the first amount of the first token for the second token, and validate the relative reserve with the non-recursive function; where the non-recursive function executes with a constant cost; where the non-recursive function executes deterministically; where the non-recursive function comprises a Newton-Raphson function; where the non-recursive function is configured to prevent precision loss; where the function is expressed as:

$$f_{AMM}(x, y, p, s, w) = sw\sqrt{\frac{xy}{p}}(px+y) - 2xysw + xyw$$

where x is a relative amount of a first asset, y is a relative amount of a second asset, p is a price of the first asset in terms of the second asset, s is a leverage parameter, and w is a dynamic weight; where the function is expressed as:

$$f(t_1, t_2, r, c) = c * \sqrt{\frac{t_1 t_2}{p}}(t_1 p + t_2) - 2t_1 t_2 c + t_1 t_2,$$

where $t_1$ indicates available liquidity of the first token, where $t_2$ indicates available liquidity of the second token, where r is the exchange rate between the first token and the second token, and where c is the slippage rate; where the function is expressed as:

$$f_2(x_0, y_0, W_{weight}, W_{factor}) = x_0^{W_{weight}} y_0 + x_0 y_0^{W_{factor} W_{weight}}.$$

where the function is expressed as:

$$f_{newFunction}(x_0, y_0, V) = x_0 y_0 (1 + y_0^{0.5} + V x_0^{0.5} y);$$

where means for using the solution to determine the price is configured to result in the exchange rate remaining within a threshold; where the solution is determined using an iterative process; where the iterative process comprises a Newton-Raphson method.

Another aspect of the disclosure provides a computer-implemented method comprising: under control of a computing device in a decentralized network, receiving, from a user device, a request to exchange a first amount of a first token for a second token, wherein the first token and the second token have an exchange rate; generating a transaction that calls a partial differential equation function of a smart contract, wherein source code of the smart contract is stored in a first block on a blockchain; transmitting the transaction to a second computing device in the decentralized network, wherein transmission of the transaction causes the transaction to be stored in a second block on the blockchain, and wherein storage of the transaction in the second block causes the partial differential equation function to be executed to produce an output; receiving the output from the second computing device; determining a second amount of the second token to be received in exchange for the first amount of the first token; and transmitting an indication of the second amount of the second token to the user device.

The computer-implemented method of the preceding paragraph can include any sub-combination of the following features: where the computer-implemented method further comprises receiving an instruction from the user device to initiate an exchange of the first amount of the first token for the second amount of the second token; where the computer-implemented method further comprises: generating a second transaction that identifies the exchange, and transmitting the second transaction to the second computing device, wherein transmission of the second transaction causes the second transaction to be stored in a third block in the blockchain, and wherein storage of the second transaction in the third block causes the exchange to complete; where a call to the partial differential equation function of the smart contract in the transaction comprises as an argument at least one of a relative reserve of the first token, a relative reserve of the second token, an Oracle price of the first token, an Oracle price of the second token, a dynamic weight, or a leverage parameter; where execution of the partial differential equation function causes a bonding curve to be calculated; where the partial differential equation function is expressed as:

$$f_{AMM}(x, y, p, s, w) = sw\sqrt{\frac{xy}{p}}(px+y) - 2xysw + xyw$$

where x is a relative amount of a first asset, y is a relative amount of a second asset, p is a price of the first asset in terms of the second asset, s is a leverage parameter, and w is a dynamic weight; where the partial differential equation function is expressed as:

$$f(t_1, t_2, r, c) = c * \sqrt{\frac{t_1 t_2}{p}}(t_1 p + t_2) - 2t_1 t_2 c + t_1 t_2,$$

wherein $t_1$ indicates available liquidity of the first token, wherein $t_2$ indicates available liquidity of the second token, wherein r is an exchange rate between the first token and the second token, wherein c is a slippage rate, and wherein the exchange rate r is set to one in response to an indication that no exchange rate r is known; where the partial differential equation function is expressed as:

$$f_2(x_0, y_0, W_{weight}, W_{factor}) = x_0^{W_{weight}} y_0 + x_0 y_0^{W_{factor} W_{weight}};$$

where the partial differential equation function is expressed as:

$$f_{newFunction}(x_0, y_0, V) = x_0 y_0 (1 + y_0^{0.5} + V x_0^{0.5} y_0);$$

where operations of the partial differential equation function are non-recursive; and where the computing device comprises an Automated Market Maker (AMM).

Another aspect of the disclosure provides an automated market maker (AMM) comprising a network interface configured to couple the AMM to a decentralized network. The AMM further comprises a non-transitory computer readable storage medium storing program instructions. The AMM further comprises a hardware processor, wherein the program instructions, when executed by the hardware processor, cause the AMM to: receive, from a user device, a request to exchange a first amount of a first token for a second token, wherein the first token and the second token have an exchange rate; generate a transaction that calls a partial differential equation function of a smart contract, wherein source code of the smart contract is stored in a first block on a blockchain; transmit the transaction to a second computing device in the decentralized network, wherein transmission of the transaction causes the transaction to be stored in a second block on the blockchain, and wherein storage of the transaction in the second block causes the partial differential equation function to be executed to produce an output; receive the output from the second computing device; determine a second amount of the second token to be received in exchange for the first amount of the first token; and transmit an indication of the second amount of the second token to the user device.

The AMM of the preceding paragraph can include any sub-combination of the following features: where the program instructions, when executed, further cause the AMM to receive an instruction from the user device to initiate an exchange of the first amount of the first token for the second amount of the second token; where the program instructions, when executed, further cause the AMM to: generate a second transaction that identifies the exchange, and transmit the second transaction to the second computing device, wherein transmission of the second transaction causes the second transaction to be stored in a third block in the blockchain, and wherein storage of the second transaction in the third block causes the exchange to complete; where a call to the partial differential equation function of the smart contract in the transaction comprises as an argument at least one of a relative reserve of the first token, a relative reserve of the second token, an Oracle price of the first token, an Oracle price of the second token, a dynamic weight, or a leverage parameter; where the partial differential equation function is expressed as:

$$f_{AMM}(x, y, p, s, w) = sw\sqrt{\frac{xy}{p}}(px+y) - 2xysw + xyw$$

where x is a relative amount of a first asset, y is a relative amount of a second asset, p is a price of the first asset in terms of the second asset, s is a leverage parameter, and w is a dynamic weight; where the partial differential equation function is expressed as:

$$f(t_1, t_2, r, c) = c*\sqrt{\frac{t_1 t_2}{p}}(t_1 p + t_2) - 2t_1 t_2 c + t_1 t_2,$$

where $t_1$ indicates available liquidity of the first token, wherein $t_2$ indicates available liquidity of the second token, wherein r is an exchange rate between the first token and the second token, wherein c is a slippage rate, and wherein the exchange rate r is set to one in response to an indication that no exchange rate r is known; where the partial differential equation function is expressed as:

$$f_2(x_0, y_0, W_{weight}, W_{factor}) = x_0^{W_{weight}} y_0 + x_0 y_0^{W_{factor} W_{weight}};$$

where the partial differential equation function is expressed as:

$$f_{newFunction}(x_0, y_0, V) = x_0 y_0 (1 + y_0^{0.5} + V x_0^{0.5} y_0).$$

Another aspect of the disclosure provides non transitory, computer-readable storage media comprising computer-executable instructions for exchanging cryptocurrency, wherein the computer-executable instructions, when executed by a computer system, cause the computer system to: receive, from a user device, a request to exchange a first amount of a first token for a second token, wherein the first token and the second token have an exchange rate; generate a transaction that calls a partial differential equation function of a smart contract, wherein source code of the smart contract is stored in a first block on a blockchain; transmit the transaction to a second computing device in a decentralized network, wherein transmission of the transaction causes the transaction to be stored in a second block on the blockchain, and wherein storage of the transaction in the second block causes the partial differential equation function to be executed to produce an output; receive the output from the second computing device; determine a second amount of the second token to be received in exchange for the first amount of the first token; and transmit an indication of the second amount of the second token to the user device.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIGS. 2A and 2B show exemplary bonding curves.

FIG. 5 shows a table illustrating various types of liquidity pools suitable for use with the novel AMM based on its unique CFMM.

DETAILED DESCRIPTION OF SPECIFIC EMBODIMENTS

Figure 1:
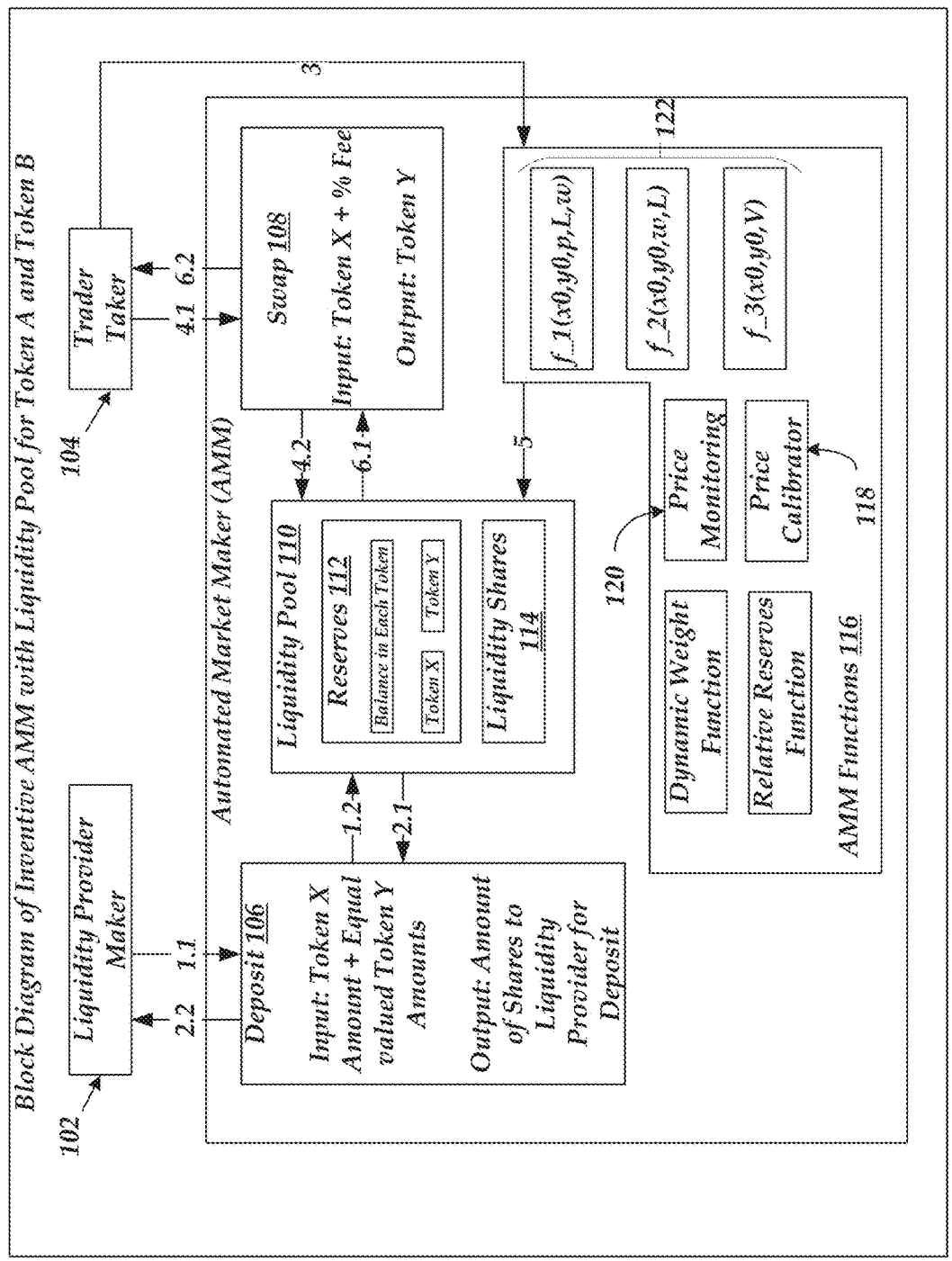
FIG. 1 shows an embodiment of AMM technology having an improved AMM.

The present disclosure describes a decentralized exchange (AMM) that provides technical benefits over conventional decentralized exchanges, including enhanced security protection, precision loss prevention, and increased computational efficiency. These technical benefits are achieved, in part, due to the fact that the AMM described herein can calculate the value of an asset to be exchanged based on a price Oracle value rather than a liquidity availability, and can use one or more partial differential equations (PDEs) to calculate a bonding curve identifying a price to exchange the assets.

For example, the Oracle value may be provided by a price Oracle service that provides a market value of the assets. The market value of the assets can be a variable input to the PDE to calculate the bonding curve between the two assets. Implementing an exchange using the value from the Oracle to generate the bonding curve can improve exchange security by preventing a bot or other unauthorized user from sabotaging a purchase of an asset (e.g., cryptocurrency) over a decentralized exchange. For example, conventional decentralized exchanges that set the exchange value of an asset based on liquidity availability, which may be susceptible to bot attacks that can disrupt exchange operations. In particular, a user may attempt to exchange one type of cryptocurrency with another type of cryptocurrency via a conventional decentralized exchange (e.g., a conventional AMM) that sets the exchange value of the cryptocurrency based on liquidity availability. A bot or other unauthorized user may attempt to attack a conventional decentralized exchange by buying cryptocurrency prior to the user's scheduled exchange of that same cryptocurrency to influence the price of the cryptocurrency. This type of attack might sabotage the scheduled exchange and operations of the conventional decentralized exchange because, in conventional decentralized exchanges, the user's price to purchase is set based on the liquidity at a particular time. As a result of the attack (e.g., as a result of the bot or other unauthorized user purchasing a certain amount of cryptocurrency prior to the user's scheduled exchange), the value of the cryptocurrency that the user is set to purchase and that was originally set by the conventional decentralized exchange may be altered (e.g., reduced) in an unauthorized manner.

The AMM described herein may have enhanced security and can prevent bot attacks from affecting exchange operations by changing the manner in which an exchange value is set as compared to conventional AMMs. For example, the AMM described herein may not use the liquidity availability of the asset in setting a value. Rather, the AMM described herein may set the exchange value based on a price Oracle value. In particular, even if a second user exchanges a first type of cryptocurrency for a second type of cryptocurrency before a first user's scheduled exchange completes and/or while the scheduled exchange is in queue, there may be little to no effect on the exchange value of the asset. Rather, the AMM described herein can give a relative reserve, which is based on the Oracle value. After every trade or exchange and before the next trade or exchange, the AMM described herein may calculate a new relative reserve to match or correspond with the Oracle value. A bot attack may affect liquidity availability, but the bot attack may not affect the Oracle value or the relative reserve given that neither value is based on liquidity availability. Thus, the AMM described herein may be able to maintain the Oracle price, and therefore offer an exchange value to a user that remains constant or nearly constant (e.g., an exchange value that is within a threshold percentage of the exchange value identified prior to initiation of an exchange, such as within 0.1%, 0.5%, 1%, etc.).

The AMM described herein may be able to offer a relative reserve and maintain the Oracle value by executing one or more PDEs. In some implementations, the AMM described herein can execute a PDE to determine a rate to exchange a first cryptocurrency token for a second cryptocurrency token. The exchange rate may not be as susceptible to sudden changes due to recent cryptocurrency exchanges as liquidity availability. As a result, the exchange rate may be more likely to remain constant or nearly constant in view of recent cryptocurrency exchanges (and therefore may be less susceptible to change in view of bot attacks). Conventional AMMs, however, are incapable of executing PDEs and instead rely on algebraic equations to calculate values, such as algebraic equations that are based on the liquidity availability for the particular cryptocurrency. For example, the source code for conventional AMMs is often written in the Solidity programming language. Solidity uses fixed point numbers. Based on the language documentation of its latest version 08.4.24, however, fixed point numbers are not fully supported by Solidity yet. For example, fixed point numbers can be declared, but cannot be assigned to or from. The main difference between floating point (e.g., float and double in many languages, including IEEE 754 numbers) and fixed point numbers is that the number of bits used for the integer and the fractional part (the part after the decimal dot) is flexible in the former, while the number of bits used for the integer and the fractional part is strictly defined in the latter. Generally, in floating point almost the entire space can be used to represent the number, while only a small number of bits define where the decimal point is. As a result, independent software libraries have been created that a conventional AMM can use to perform calculations up to 18 decimal places. In conventional AMMs that use conventional external software libraries, executing calculations up to 18 decimal places may be useful because it may match a size of cryptocurrency token values. Execution of calculations up to 18 decimal places may also be sufficient to execute algebraic equations. In fact, performing calculations larger than 18 decimal places can be computationally expensive (e.g., memory and/or processor usage intensive) and provide little benefit given that the conventional AMMs solve algebraic equations that otherwise do not require more than 18 decimal places. However, it may not be possible to solve a PDE if executed calculations result in no more than 18 decimal places due to rounding errors and/or integer overflow conditions that may occur and that solution offered by its derivatives also can be with discretization errors.

Aspects of the present disclosure disclose an AMM that can solve a PDE with 24 digits or more after the decimal point to ensure control over discretization errors to achieve a solution. Some aspects of the present disclosure include specialized software libraries for blockchain applications which can produce resulting numbers with 24 decimal places or more. For example, the software libraries used by the AMM described herein may include modified global variables in which each global variable identified in the software library is initially defined to have a value with at least 24 decimal places. When a mathematical operation of the PDE or any other function is performed to produce a value for a global variable, the value may therefore be capable of having at least 24 decimal places. High-precision mathematics and desirable convergence rate can reduce computation time on a blockchain and increase an accuracy of a result. The AMMs according to the present disclosure can efficiently solve the PDEs with these software libraries. Because conventional AMMs cannot execute PDEs, conventional AMMs cannot calculate an exchange rate with such precision. Conventional AMMs may be incapable of achieving the security benefits of the AMM described herein. Thus, the AMM described herein can use PDEs to track continuous change in the market, providing for enhanced ability to calculate cryptocurrency value for currency exchanges.

The AMM described herein also provides technical benefits over conventional AMMs through the creation and use of specific types of software libraries. For example, the software libraries used by the AMM described herein may provide enhanced security protection, precision loss prevention, and increased computational efficiency. Software libraries used by conventional AMMs are known to have exploits vulnerable to attackers, such as precision loss from calculations. For example, software libraries used by conventional AMMs produce calculations with precision loss because these software libraries round down a calculated result and truncate the number of decimal places to fit the calculated result to a variable with a predetermined size. For example, conventional AMMs use a fixed-point number system, where the data type and the number of decimal places are predetermined. During an arithmetic operation performed by a conventional AMM that involves floating-point numbers, the result of the code execution may not be accurate due to the limited precision of the fixed-point system. This precision loss can cause unexpected behavior in the execution of a cryptocurrency exchange, in the execution of a smart contract, and/or the like, such as rounding errors or arithmetic overflow and underflow conditions. As a result, a bot or other unauthorized user could take advantage of the rounding errors or arithmetic overflow or underflow conditions to cause another user to experience a loss of funds, to artificially inflate the bot or other unauthorized user's balance, and/or the like. In fact, a conventional AMM may produce transactions that memorialize a cryptocurrency exchange that are stored on a distributed ledger that cannot be verified given the precision loss.

The AMM described herein uses software libraries that maintain the size of the variables used to perform calculations. In other words, the software libraries described herein may not round down a calculated result or truncate the number of decimal places. As a result, the software libraries described herein may provide more precise calculations, thereby providing enhanced security protection and preventing precision loss. As described herein, maintaining the variable sizes can prevent truncation of calculations and can avoid the vulnerabilities found in software libraries used by conventional AMMs. For example, software libraries of a conventional AMM may execute a logarithm function that returns a value for a variable with a predetermined size. Within the logarithm function, one or more operations may be performed one of several orders. Each time the software libraries of the conventional AMM execute the logarithm function, however, the software libraries may produce different values because there may be a truncation after each operation is performed and the truncations may cause different values to be produced as subsequent operations are performed in different orders.

Further, the increased precision allows for the AMM described herein to solve for calculations that conventional AMMs are currently unable to perform because of precision loss. Conventional AMMs implement the fixed-point system as disclosed above to solve square roots and logarithmic functions, which currently truncate calculations and provide inconsistent results. Thus, the AMM described herein provides increased functionality over conventional AMMs.

For example, the AMM described herein can implement the Newton-Raphson method for solving functions (e.g., square root and logarithmic functions), which allows for improved computational efficiency in solving PDEs, while also allowing for high precision in the number of decimal places. The Newton-Raphson method is resource efficient and can solve large number calculations with a constant computational cost (e.g., the processing load utilized by the AMM described herein in executing a function may be consistent regardless of the input or output values of the function) that is lower than the computational cost of conventional AMMs executing similar functions. The processing requirements of the AMM described herein are lower than the processing requirements of conventional AMMs because the operations executed by the AMM described herein to solve or execute a function may be non-recursive (e.g., the number and/or types of operations to be executed to solve or execute a function are predetermined or preset and may not involve any recursive loops). Conventional AMMs may solve or execute the same type of function using recursive operations. Prior to the function being solved or executed, it may be unknown how many recursive loops would be needed to solve or execute the function. As a result, the processing load of a conventional AMM in solving or executing a function may be inconsistent and can exceed the processing load of the AMM described herein. As a result, the conventional AMM may have to allocate more computing resources to executing or solving the function than may be needed to account for situations in which the solving or execution involves many recursive loops. The conventional AMM therefore may have to deallocate computing resources from other operations (e.g., cryptocurrency exchanges initiated by other users), causing delays in the execution of these other operations. In fact, because the AMM described herein solves or executes functions in a non-recursive manner, the AMM described herein may produce results in a deterministic manner regardless of the size of inputs and/or outputs to the function. Conventional AMMs, on the other hand, may produce results that are non-deterministic and that may vary based on the size of inputs and/or outputs to the function.

As described above, a blockchain is a distributed ledger that can be used to record transactions. The blockchain includes a set of blocks, the number of which grows over time. To allow the blockchain to grow, some computing devices may function as "miners," with at least one of the miners (e.g., computing devices) being selected to form a new block in the blockchain. The selected computing device may be referred to as a leader. To be considered for selection as a leader, a computing device may be required to expend resources. For example, in some conventional blockchain implementations, a computing device may be required to generate a proof of work in which the computing device is attempting to generate a hash value that is less than a target value. A computing device may have to generate multiple hash values before finding one that is less than the target value. The computing device is therefore consuming computing resources (e.g., processing resources), and ultimately energy (e.g., electricity), to find a hash value that is less than the target value.

Generally, the computing device that is first to find a hash value that is less than the target value is selected as the leader. While there is a cost associated with becoming the leader (e.g., the cost of the electricity consumed to find the hash value that is less than the target value), the computing device selected as a leader is rewarded with a block reward (e.g., cryptocurrency) and/or transaction fees. For example, as described herein, transactions are stored or encoded in blocks. To submit a transaction, a computing device (e.g., a user's wallet, a user device, etc.) may have to pay a transaction fee to the leader (e.g., computing device acting as the miner) forming the block within which the transaction is to be stored.

An automated decentralized asset exchange system is disclosed that integrates blockchain in the decentralized finance field. A new set of technology improvements are provided for trading of decentralized assets, known specifically as cryptocurrency. The improvements include providing liquidity to a liquidity pool by a liquidity provider, depositing an X cryptoToken and a Y cryptoToken into the liquidity pool in a stable value ratio and volatile value ratio, providing liquidity to liquidity pools, and exchanging between an X cryptoToken and a Y cryptoToken. A novel AMM is provided with new mathematical cost functions which acts as the counterparty to all trades. Thus, liquidity can be provided even when markets are thin.

The foregoing aspects and many of the attendant advantages of this disclosure will become more readily appreciated as the same become better understood by reference to the following detailed description, when taken in conjunction with the accompanying drawings.

FIG. 1 shows an embodiment of AMM technology having an improved AMM 100. In one embodiment, the improved AMM 100 comprises new multinomial differential equations as market maker functions 122 and sub equations derived thereof. The AMM 100 includes a novel Price Calibrator 118 and a Price Deviation monitor 120. In one embodiment, an invariant differential equation is solved using Newton Raphson's Method with several derivatives. AMM for stable coin and stable ratio swap is a first of its kind market maker with an invariant constant. The CFMM follows a price curve graph with its invariant. Following AMM convention, price (Pl is defined as the rate of change in Y reserves per change in X reserves. Unlike conventional AMMs, each derivative defined for the CFMM offers a rate of change based on a combination of a Slop parameter (S)

and Price (P). The innovative differential equation takes a unique approach to allow including external price (P) into the invariant to offer market price-based swap.

In various embodiments, the novel AMM technology includes five main functions/components as follows.

1. Liquidity providers deposit tokens to curve liquidity pools.
2. Liquidity pools are where liquidity provider tokens are kept to create exchange liquidity.
3. Traders swap tokens with the liquidity pool, creating buy and sell pressures that help determine token prices.
4. AMM algorithms efficiently price the tokens in the liquidity pool according to various factors, such as buy and sell pressures driven by traders.
5. The process crowdsources its liquidity and uses algorithms to determine the prices of liquidity pool assets, then enables traders to trade with the pool via smart contracts. The price from external market data sources, like Price oracles, can be directly provided into AMM algorithms.

In one embodiment, the AMM 100 comprises liquidity provider 102, liquidity taker 104, deposit account 106, swap account 108, liquidity pool 110, and AMM functions 116. In one embodiment, the liquidity pool comprises reserves 112 and liquidity shares 114. During a transaction, the following operations occur.

At step (1), a maker/liquidity provider 102 approves the market Maker (DEX) to deposit Token A and Token B in proportion to the Token A crypto assets' dollar value in the pool. The liquidity-provider's claim on the pool is proportional to its contribution.

At step (2), after the deposit in step (1), the reserves 112 of Token A and Token B in the Liquidity pool 110 increases. Following the AMM 100 algorithm, the liquidity provider 102 has a claim of a certain amount of shares of the pool's crypto-assets. The share is a percentage of the deposit to the balance in reserves.

At step (3), the liquidity taker 104 wishes to buy Token B requesting a Token A Price to the AMM 100. The AMM 100 gives out a price following a selected bonding curve.

At step (4), the liquidity taker 104 discovers the price and buys Token B. The liquidity taker 104 approves the market maker (e.g., AMM 100) to use a swap function to access their balance of Token A in return of Token B. The liquidity takers' exchange between token A and token B occurs on the basis of one of the market maker functions 122 that links relative prices and quantities (also known as a bonding curve).

At step (5), the market maker (e.g., AMM 100) contract authenticates the liquidity taker's approval, verifies that the swap order has not expired, verifies that the swap has not already been filled, and then calculates the amount of Token B between the two parties at the specified exchange rate.

At step (6), once the amount of output Token B is calculated at the exchange rate, the market maker contract transfers Token B to the liquidity taker.

Being purpose-built as a multi-functional crypto exchange process also means the innovative AMM offers both traders and liquidity providers key advantages such as:
1. Minimized slippage-stable ratio coins are possible to be traded near zero slippage with innovation on algorithms, high-volume trading pairs are subject to slippage, but curve's similar asset pools minimize this.
2. No impermanent loss-Liquidity providers on the novel AMM supply stable coin pairs that nearly eliminate impermanent loss.

Bonding Curves

FIGS. 2A and 2B show exemplary bonding curves, also referred to as cost functions. In some examples, the AMM can request the execution of a function in a smart contract that includes solving a PDE. An output produced by solving the PDE may be an exchange value for exchanging one asset for another asset and/or a value that can be used to derive the exchange value. For example, the AMM can request at least one peer node to execute the function of the smart contract in response to receiving an indication from a user that the user would like to exchange one asset for another asset and/or in response to receiving a request from a user for a current exchange value for exchanging one asset for another asset. The smart contract may be stored on a blockchain via a transaction previously provided to a peer node or a miner device by the AMM or another device (not shown). The solution to the PDE can provide the bonding curves between two assets to exchange. In some examples, the solutions to the PDE produce results that can be graphically depicted as the bonding curves with a certain curvature. The trading strategy between a first asset (e.g., $x_0$) and a second asset (e.g., $y_0$) is dictated by the bonding curve between the two assets. The bonding curve can include a tangent line extending from the curvature of the bonding curve. The slope of the tangent line at any given point represents an instantaneous price between the assets. The instantaneous price can be the ratio of a price of the first asset and in units of the second asset. In some examples, the instantaneous price can be obtained from the Oracle service. The bonding curve curvature can include varying degrees of steepness (also known as slippage). A steeper curvature can result in a higher trade price impact. A less steep curvature can result in lower trade impact. For example, the price to exchange the first asset for the second asset can vary, which can cause the price of the exchange to move along the tangent line. In this manner, if the price were to move along the tangent line with a steeper slope, the price is impacted greater than a tangent line with a flatter slope. Some aspects of the present disclosure can include the AMM adjusting the curvature of the bonding curve. For example, the AMM can adjust the curvature in response to highly volatile market conditions and dynamically change the shape of the curve to broaden the width around the current price.

In some examples, the AMM can receive variables to call the PDE to form the bonding curve. For example, the AMM can receive variables such as relative reserves of each of the assets, price of the assets (e.g., according to the Oracle service), dynamic weights, and/or leverage parameters. Relative reserves are a quantifiable amount of assets relative to a price at any given point in time. The relative reserve can maintain unitary elasticity of demand within the AMM. For example, any change in the price of the assets exchanged can use the relative reserve during the exchange to maintain a fair market value of the asset. The use of the relative reserve in this manner can maintain stability of the price between the assets, even in the case when liquidity changes before or during an exchange. In the case of conventional AMMs, the trade price is derived from either actual reserves or virtual reserves, or both. In some examples, and in the case of the AMM, the relative reserves are values derived from a price and actual available reserves. In some examples, the price of the assets is derived from the Oracle. In some examples, the price of the assets used to calculate the relative reserve is derived from the Oracle. Dynamic weight is a measurable factor that links the actual and relative reserves of a liquidity pool. This factor is a deviation measurement between actual and relative reserves that constantly varies due to the price changes of the underlying assets. The dynamic weight can be used by the AMM to balance the liquidity pool by assigning higher weights to underrepresented assets and lower weights to overrepresented ones. In this manner, assets are always offered at market prices, maintaining a competitive edge, despite the asset ratio in the pool suggesting a different price in traditional AMMs. The leverage parameter in AMM can be a number. In some examples, the leverage parameter can range from 0 to 1. In some examples, the leverage parameter can be an external value, impacted by factors independent of the AMM. In some examples, the leverage parameter can modify the liquidity depth and range, facilitating the handling of large trade orders with reduced slippage.

In some examples, the PDE can receive variables as input to calculate a bonding curve. The PDE can be defined as follows:

$$f_{AMM}(x, y, p, s, w) = sw\sqrt{\frac{xy}{p}}(px+y) - 2xysw + xyw$$

Where x is a relative amount of a first asset, y is a relative amount of a second asset, p is a price of the first asset in terms of the second asset, s is a leverage parameter, and w is a dynamic weight. In some examples, the price of the first asset in terms of the second asset can be represented by the instantaneous price of the assets is obtained from the price Oracle, which can also represent the slope of the tangent line of the bonding curve.

As shown in FIG. 2A, in various embodiments, an asset exchange occurs on the basis of one of the market maker's bonding curves (201-205) that links relative prices and quantities. The following exemplary bonding curves are utilized by the market maker (e.g., AMM 100) during an asset exchange. A first bonding curve is expressed as:

$$f(x_0, y_0, p_0, f_{factor}) = A_{constant}$$

where $p_0$ is the price of asset $x_0$ in terms of asset $y_0$ and $f_{factor}$ is set to [0 . . . 1], which is suitable for a stable ratio market maker.

A second bonding curve is expressed as:

$$f_{stable}(x_0, y_0, f_{factor}) = A_{constant}$$

where $p_0$ is a constant value of 1 and $f_{factor}$ is set to [0 . . . 1], which is suitable for a stable coin market maker.

A third bonding curve is expressed as:

$$f_2(x_0, y_0, W_{weight}, W_{factor}) = A_{constant}$$

$$f_2(x_0, y_0, W_{weight}, W_{factor}) = x_0^{W_{weight}} y_0 + x_0 y_0^{W_{factor} W_{weight}}$$

where $W_{weight}$ is set to [1 . . . 8] and $W_{factor}$ is set to [0 . . . 1], which is suitable for a weighted asset allocation market maker. In one embodiment, the novel market maker operations of the AMM 100 combine both the bonding curve model and the straight-line model to effectively reduce price slippage in stable ratio asset swapping. The novel methods expand asset swapping with a given price ratio including regular 1-to-1 ratio.

A fourth bonding curve is expressed as:

$$f_{newFunction}(x_0, y_0, V) = Constant$$

$$f_{newFunction}(x_0, y_0, V) = x_0 y_0 (1 + y_0^{0.5} + V x_0^{0.5} y_0)$$

where (V=0 or 1), $x_0$ is the amount of available reserve of token 1, and $y_0$ is the amount of available reserve of token 2.

In one embodiment, when V=0, the operation of the AMM 100 with this function offers a 60%-40% asset allocation between two tokens on a DEX liquidity pool. In another embodiment, when V=1, the AMM 100 uses an optimal weight distribution to lower the capital deposits by 25% and the purpose of this function is to offer a Price higher than the reserve ratio. Thus, this volatile AMM 100 embodiment takes a lower reserve ratio and offers liquidity priced above the geometric mean of the actual liquidity in a DEX liquidity pool.

As shown in FIG. 2B, in various embodiments, an asset exchange occurs on the basis of one of the market maker's bonding curves (252-260) that links relative prices and quantities. The following exemplary bonding curves are utilized by the market maker (e.g., AMM 100) during an asset exchange. In the following expressions of bonding curves, p denotes a random rate of change between any two positive variables $x_0$ and $y_0$ and a rate of deviation among instances of p is denoted with variable w. If w associates variables both $x_0$ and $y_0$ with p for retaining an equilibrium, then there exists an identity function satisfying: $f_1(x_0, y_0, p, L, w) - C = 0$ where C is an invariant constant. A first bonding curve is expressed as:

$$f_1(x_0, y_0, p, L, w) = Lw\sqrt{\frac{x_0 y_0}{p}}(px_0 + y_0) - 2x_0 y_0 Lw + x_0 y_0 w$$

where $x_0$ can be a relative amount of a first token, $y_0$ can be a relative amount of a second token, $p_0$ can be a price of asset $x_0$ in terms of $y_0$, L can be a leverage parameter such that $0 \le L \le 1$, w can be a dynamic weight that associates $x_0$ and $y_0$ to change in $p_0$ to retain invariant constant C A second bonding curve is expressed as:

$$f_2(x_0, y_0, L, w_{factor}) = x_0^{W_{weight}} y_0 + x_0 y_0^{W_{weight} W_{factor}}$$

where $x_0$ can be a tradable amount of a first token, $y_0$ can be a tradable amount of a second token, $w_{factor}$ can be a leverage parameter such that $0 \le L \le 1$, $W_{weight}$ can be a static weight that associates $x_0$ and $y_0$ to invariant Constant, C.

A third bonding curve is expressed as:

$$f_3(x_0, y_0, W_{factor}) = x_0 y_0 (1 + y_0^{0.5} + w_{factor} x_0^{0.5} y_0)$$

where $W_{factor}$ can be 0 or 1, $x_0$ can be a tradable amount of a first token, $y_0$ can be a tradable amount of a second token.

Additional Information with Examples

For a liquidity pool with Token A and Token B pair, the amount of liquidity deposit needed for Token B on the current price may be [(75% of Current Price)]X[Amount of Token B]. For example, assume the current price of Token B=25 in Token A value. The Token B amount available at a liquidity provider for deposit=1200 Token B. On a regular constant product market maker (CPMM) based liquidity pool, the amount of Token A needed for Deposit is $25× 1200=30,000 Token A ([Current Price] X Amount of Token B).

Using the above (fourth bonding curve) formula based volatile Market Maker liquidity pool, the amount of Token A needed for deposit 1200 Token B to price at 25 in Token A value is:

=(75% of Current Price)×1200

=(75% of 25)=18.75=18.75×1200=22,500 Token A which is 25% less deposit than a regular (conventional) constant product market maker.

Figure 3:
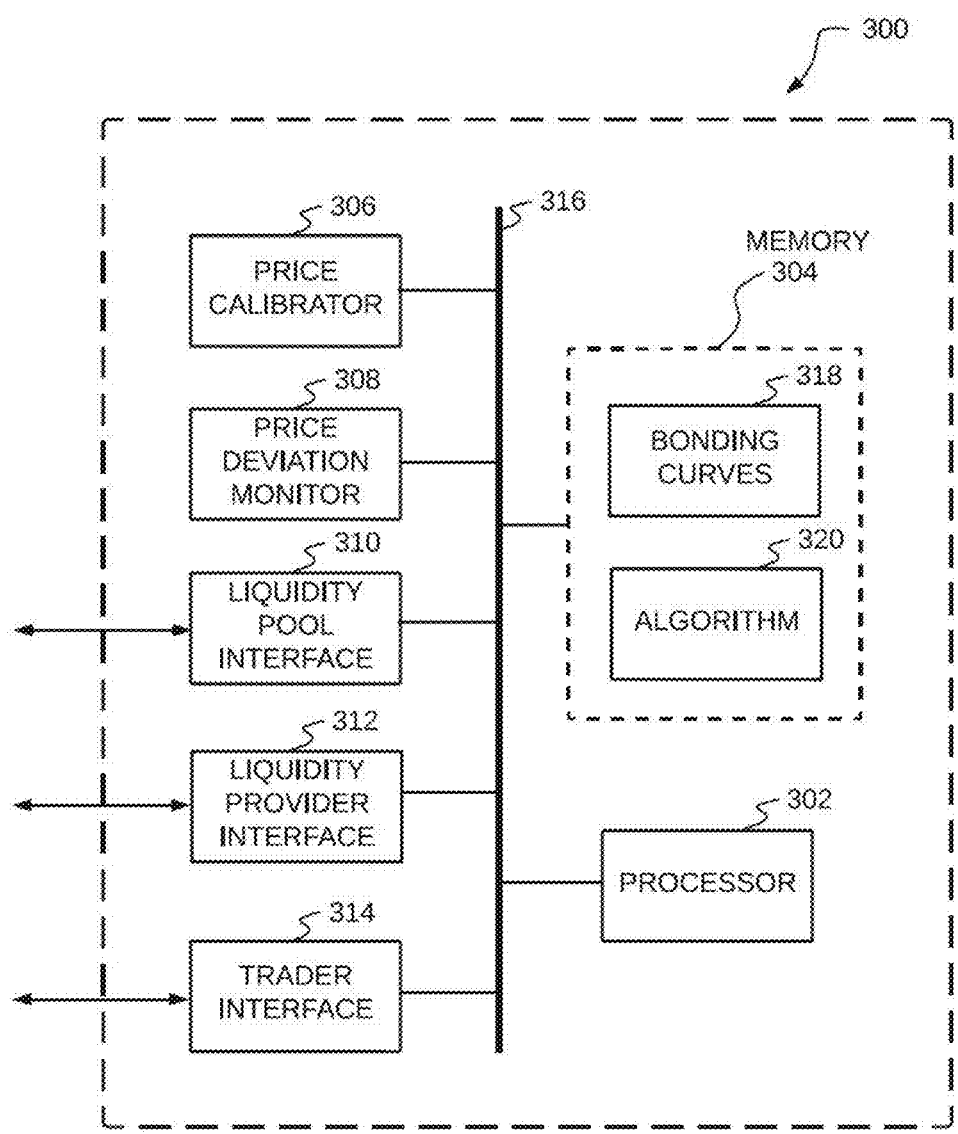
FIG. 3 shows a detailed embodiment of an AMM with technology improvements.

After the deposit, the pools will have an addition of 1200 Token B and 22,500 Token A, and therefore the updated spot price for trading will be:
1. Token B will be priced at 25 Token A
2. Token A will be priced at 0.04 Token B FIG. 3 shows a detailed embodiment of an AMM 300 with technology improvements. For example, the AMM 300 is suitable for use as the AMM 100 shown in FIG. 1. The AMM 300 comprises processor 302, memory 304, price calibrator 306, price deviation monitor 308, liquidity pool interface 310, liquidity provider interface 312, and trader interface 314 all connected to communicate over bus 316. The memory 304 comprises bonding curves 318 and market maker algorithm 320.

In various embodiments, the AMM 300 provides several technology improvements over conventional market maker technology. A first technology improvement comprises an interface that allows a Taker to exchange between two same valued assets with low slippage using one interface.

A second technology improvement comprises an interface that maintains a stable ratio between two decentralized assets and allows a Taker to exchange one to another on the ratio with low slippage using the interface.

A third technology improvement utilizes price discovery protection during an asset transaction to retain valuation of similar assets in a defined price range.

A fourth technology improvement provides that above mentioned interfaces can be utilized for price oracle feeds to applications in the decentralized finance field.

In one embodiment, the technology improvements are provided by processing units using the smart contract technology, interfaces that maintain a liquidity inventory storage, a price oracle storage, and liquidity incentive storage. A processing unit that is connected to processing or blockchains providing the smart contract technology provides an interface for accessing the decentralized exchange.

In one embodiment, the AMM 300 performs a method for trading of decentralized assets, known as cryptocurrency. Specifically, the method includes providing liquidity to a liquidity pool by a liquidity provider, depositing an X cryptoToken and a Y cryptoToken into the liquidity pool in a stable value ratio and volatile value ratio, providing liquidity to Liquidity Pools, and exchanging between an X cryptoToken and a Y cryptoToken.

In one embodiment, the AMM 300 utilizes novel mathematical cost functions, which act as the counterparty to all trades. Thus, liquidity is provided even when markets are thin. A Taker can determine to swap from the liquidity pool or the maker pools based on a price determined by AMM 300.

In one embodiment, the AMM 300 provides novel cryptocurrency trading methods in an AMM implementation for decentralized crypto exchange. The new technology includes algorithmic methods that combine both a bonding curve model and a straight-line model to effectively reduce price slippage in asset swapping. The novel methods expand asset swapping with a given price ratio including a regular 1-to-1 ratio. Market making is a complex optimization problem, in which all information known at a given point in time (including historical data) is used to generate market orders that maximize expected returns of the strategy. The basic algorithm for the AMM 300 is to (1) establish a reference price for the asset, and then (2) set bid and ask prices on the exchange.

In addition to basic algorithms, the AMM 300 performs novel algorithms that offer:
(a) auto calibration to retain a reference price for the assets in liquidity pool, which is popularly known as pegging mechanism
(b) Offer exchange rate for assets can be fed from external reliable sources or predefined.
(c) Offer Price monitoring algorithm to verify maximum price deviation per swap and verify maximum allowed price deviation for selective crypto assets, which are bound to a particular value against dollar. The value can be predefined to 1-to-1 or 1-to-N.

Figure 4:
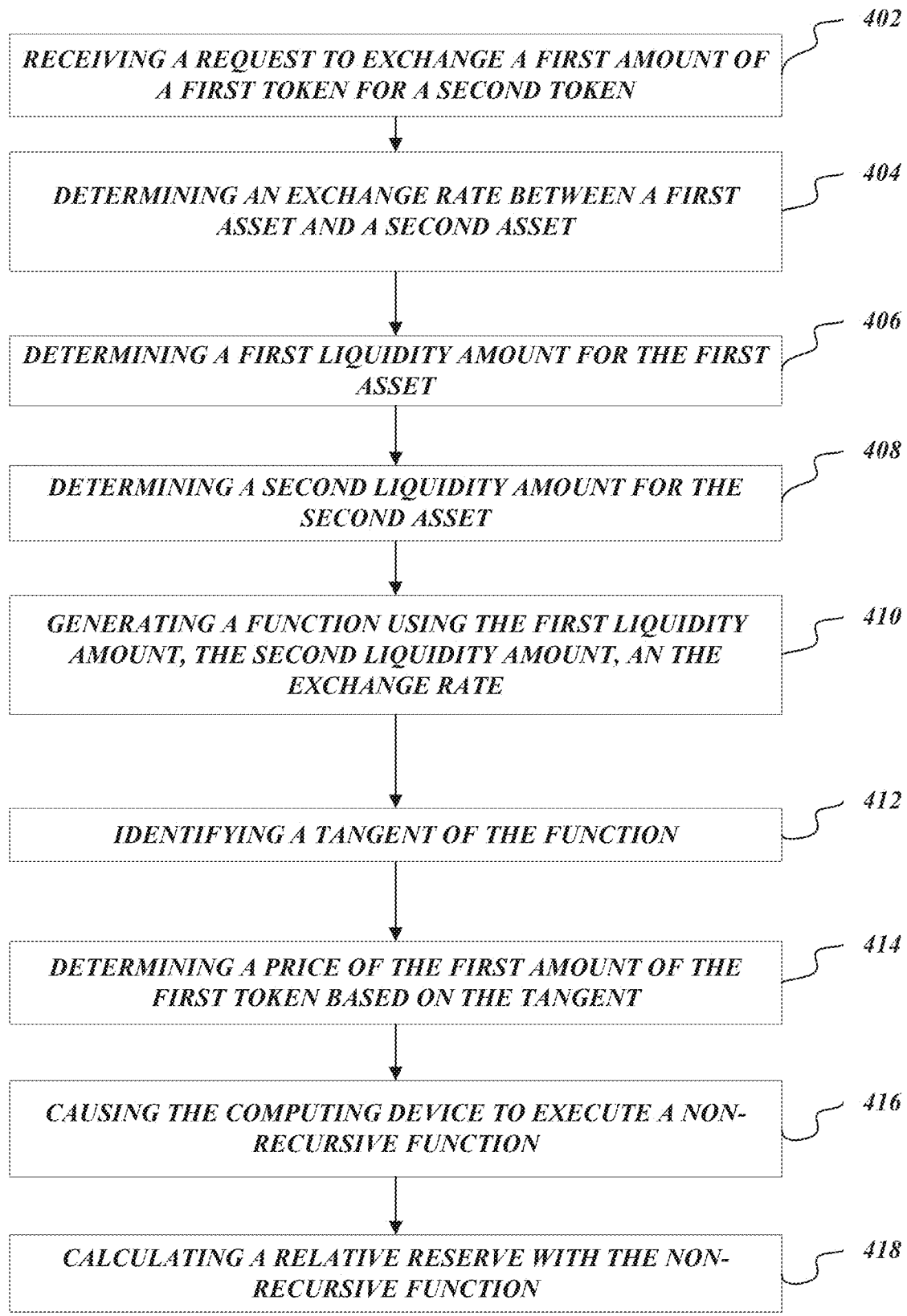
FIG. 4 shows an embodiment of a method for operating an AMM.

FIG. 4 is a flow diagram depicting an AMM routine 400 illustratively implemented by an AMM, according to one embodiment. As an example, AMM 708 of FIG. 7 can execute the AMM routine 400. The AMM routine 400 begins at block 402.

At block 402, a request is received to exchange an amount of a first asset for a second asset. For example, a user interacting with a computing device that interfaces with a blockchain can prompt the computing device to initiate an exchange of the first asset for the second asset. The user can access a user interface allowing such financial transactions to occur. The request can be transmitted by the computing device to the distributed network of the blockchain. The request can include at least one application programming interface (API) call to initiate the exchange process.

At block 404, an exchange rate is determined between the first and second assets. For example, the first asset and the second asset can have different values at a current time. The values of the first asset and the second asset can be based on a price Oracle value. The Oracle values of the first asset and the second asset can be determined through at least one API call. The API call can reference software libraries with program instructions to calculate values of the first asset and the second asset with PDEs.

At block 406, a first liquidity amount of the first asset is determined. For example, the liquidity amount of the first asset can represent a comparable financial equivalent in a tangible financial medium, such as dollars. In such an example, the first asset will have a corresponding financial value in the tangible financial medium.

At block 408, a second liquidity amount of the second asset is determined. For example, the liquidity amount of the second asset can represent a comparable financial equivalent in a tangible financial medium, such as dollars. In such an example, the second asset will have a corresponding financial value in the tangible financial medium.

At block 410, a function is generated based on the first liquidity amount, the second liquidity amount, and the exchange rate. For example, the function can receive as input the first asset value, the second asset value, and the exchange rate to provide an output based on the input values. The function can take the form of a PDE. In other examples, the function can include the Newton-Raphson function. The function may be deterministic in nature. The deterministic aspect of the function can allow the execution of the function to complete in a constant time and with a consistent processing load, that is the same regardless of the input. The function may also include non-recursive operations, such that the function has no recursive components to solve for calculations. The function can include program code to execute in a manner to produce outputs with increased precision to prevent precision loss. For example, the precision can extend to 24 decimal places or greater.

At block 412, a tangent of the function is identified. For example, the tangent of the function can include a mathematical operation to solve for a value associated with the function. The mathematical operation can include a tangent operation. The value associated with the function can include the price at which to exchange the assets. In some examples, the tangent of the bonding curve can provide a price between a first asset and a second asset. In some examples, the tangent can be an input to a PDE, as disclosed herein. For example, an input to the PDE includes the price between two assets, which is based on the instantaneous price of the assets and corresponds to the slope of the tangent line. The tangent can be visually represented as a straight line, a plane, or any other geometry, extending from a bonding curve. The tangent can include a slope of the straight line. The slope can correspond with the curvature of the bonding curve. In some examples, the bonding curve is rounded such that the slope has a reduced steepness. In some examples, the bonding curve is flat such that the slope has an increased steepness. In some examples, the curvature of the bonding curve, and thus the steepness of the tangent line slope, can correspond to a leverage parameter. The leverage parameter can be an external value, impacted by factors independent of the AMM.

At block 414, a price for the second asset is determined based on the tangent. For example, the tangent of the function can include a mathematical operation to solve for a value associated with the function. In this example, the value solved can include the price of the second asset. The function can be expressed as:

$$f(t_1, t_2, r, c) = c * \sqrt{\frac{t_1 t_2}{p}} (t_1 p + t_2) - 2 t_1 t_2 c + t_1 t_2,$$

where $t_1$ indicates available liquidity of the first token, where $t_2$ indicates available liquidity of the second token, where r is the exchange rate between the first token and the second token, and where c is the slippage rate.

At block 416, the computing device is caused to execute a non-recursive function. For example, the non-recursive function can include software components, such that the function has no recursive components to solve for calculations. The software components can be written in a manner to minimize resources used to execute the calculations for the non-recursive function. In such an example, the function can include program code to execute in a manner to produce outputs with increased precision to prevent precision loss. For example, the precision can extend to 24 decimal places or greater. The function can receive as input the first asset value, the second asset value, and the exchange rate to provide an output based on the input values. The function can take the form of a PDE. In some examples, the function is non-iterative and/or non-recursive. Optionally, the function can include the Newton-Raphson function. The function may be deterministic in nature. The deterministic aspect of the function can allow the execution of the function to complete in a constant time, that is the same regardless of the input.

At block 418, the non-recursive function is used to calculate a relative reserve. For example, the relative reserve can include a current price of the first asset and the second asset, regardless of the liquidity available. The relative reserve is based on the Oracle values, which considers numerous factors that can impact the prices of the first asset and the second asset.

Fewer, more, or different blocks can be used as part of the routine 400. In some cases, one or more blocks can be omitted. Furthermore, it will be understood that the various blocks described herein with reference to FIG. 4 can be implemented in a variety of orders, or can be performed concurrently. For example, block 408 can be performed prior to block 406, and block 414 can be performed prior to block 412.

Liquidity Pools

FIG. 5 shows a table 500 illustrating various types of liquidity pools suitable for use with the novel AMM based on its unique CFMM. The innovation of novel AMM comprises a new multinomial differential equation and sub equations derived from it. In one embodiment, an invariant differential equation is solved using Newton Raphson's Method with several derivatives. The novel AMM for stable coin and stable ratio swap is a first of its kind market maker with an invariant constant. The CFMM like other AMM also follows a price curve graph with its invariant. Following AMM convention, price (P) is defined as the rate of change in Y reserves per change in X reserves. Unlike common AMMs, each derivative defined for the CFMM offers a rate of change based on a combination of a Slop parameter (S) and Price (P). The innovative differential equation takes a unique approach to allow including external price (P) into the invariant to offer market price based swap.

Figure 6:
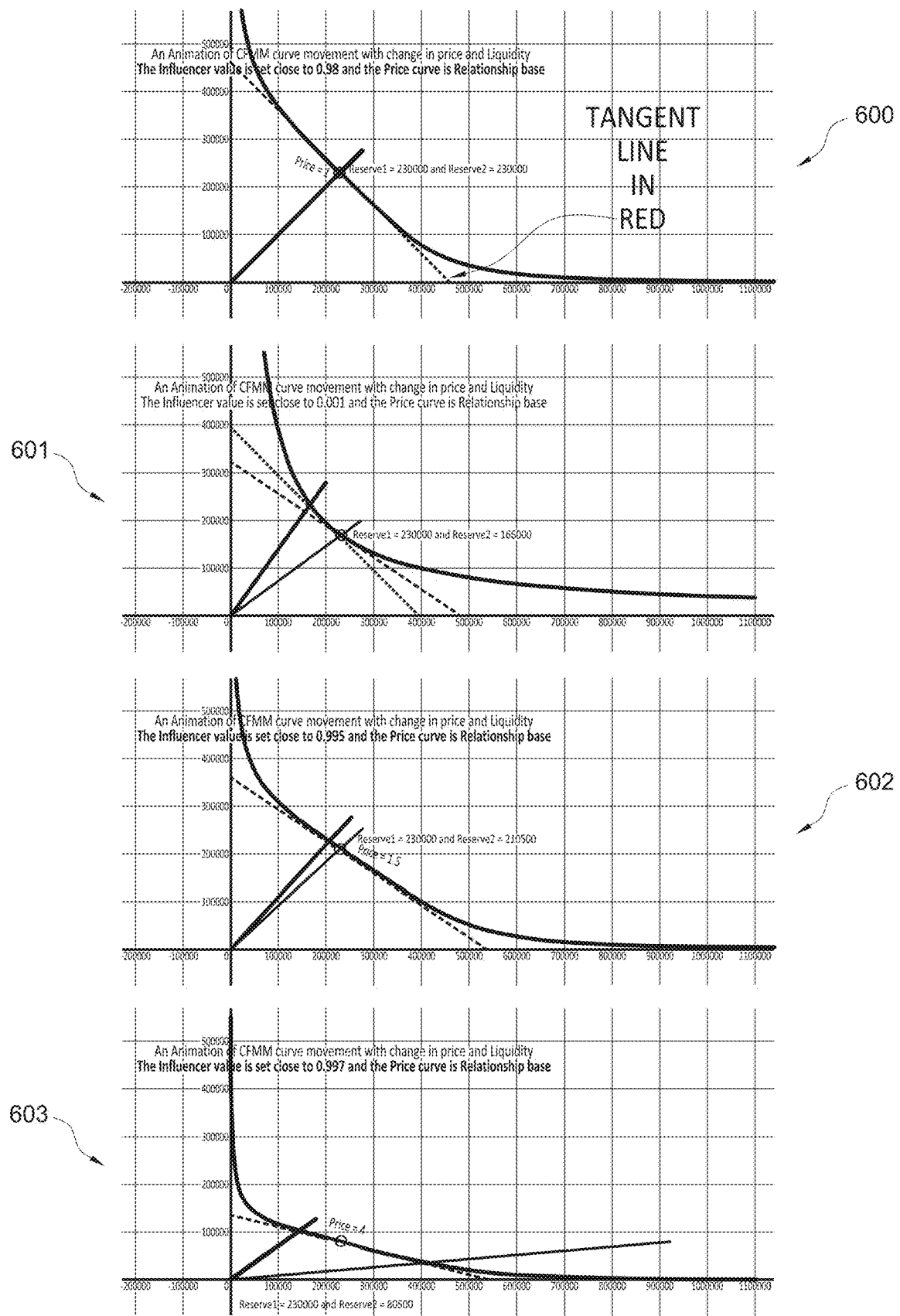
FIG. 6 shows exemplary graphs illustrating cost function curves during operation of a novel AMM.

FIG. 6 shows exemplary graphs 600-603 that illustrate cost function curves during operation of a novel AMM.

Figure 7:
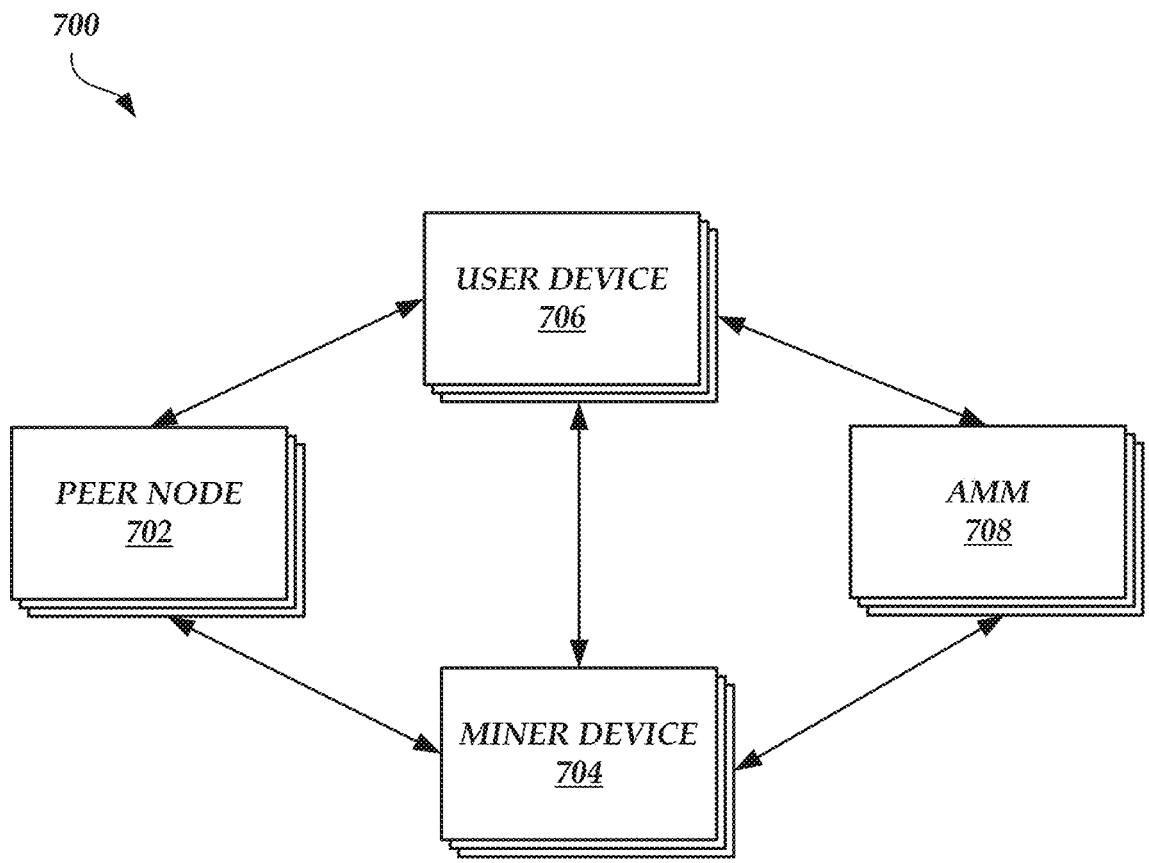
FIG. 7 is a block diagram of an illustrative operating environment in which an improved AMM is present.

FIG. 7 is a block diagram of an illustrative operating environment 700 in which an improved AMM 708 is present. The operating environment 700 includes one or more nodes 702, one or more miner devices 704, one or more user devices 706, and one or more AMMs 708. The peer node(s) 702 may represent physical or virtual computing devices acting as peers or nodes (e.g., devices that store an incomplete or complete copy of the blockchain and that can verify some or all transactions that have occurred since the genesis of the blockchain) in a decentralized network, the miner device(s) 704 may represent physical or virtual computing devices acting as miners (e.g., devices that form new blocks in a blockchain, where some of the devices may also store an incomplete or complete copy of the blockchain and/or obtain information about the blockchain from other peer node(s) 702 and/or miner devices 704) in a decentralized network, the user device(s) 706 may represent physical or virtual computing devices (e.g., devices operated by users having a wallet that stores cryptocurrency) with access to the decentralized network that can provide transactions (e.g., updates to application data, new application data, participant transactions, etc.) for processing and/or storage in the blockchain, and the AMM(s) 708 may represent physical or virtual computing devices with access to the decentralized network that can initiate and complete the exchange of one type of virtual asset (e.g., a first type of cryptocurrency) for another type of virtual asset (e.g., a second type of cryptocurrency). Optionally, the AMM(s) 708 may also be in communication with an Oracle service, not shown, that can provide Oracle values for one of more types of assets. Each of the peer node(s) 702, the miner device(s) 704, the user device(s) 706, and/or the AMM(s) 708 may communicate with each other in a decentralized network (e.g., a peer-to-peer network).

In general, the peer node(s) 702, the miner device(s) 704, the user device(s) 706, and/or the AMM(s) 708 can be any computing device such as a server, desktop, laptop or tablet computer, personal computer, wearable computer, server, personal digital assistant (PDA), hybrid PDA/mobile phone, mobile phone, electronic book reader, set-top box, voice command device, camera, digital media player, and the like.

As described in greater detail below, a peer node 702 and/or a miner device 704 can launch and execute one or more instances, where each instance acts as a node in a decentralized network that implements the peer node described herein and can be associated with a user or participant.

In particular, each instance running on each peer node 702 and/or miner device 704 may store the same information, such as block information (e.g., data identifying committed transactions, block header data, etc.), etc. The instances (or computing devices) may store the same information because each instance (or computing device) may broadcast a message to one or more other instances (or one or more other computing devices) when the respective instance (or computing device) submits a transaction or receives a message indicating that a transaction has been submitted. For example, the instances (or computing devices) can communicate using a gossip protocol in which an instance (or computing device) forwards messages indicating that a transaction is submitted to its neighbor instances (or neighbor computing devices). Because each instance (or computing device) receives and stores the same transaction data, each instance (or computing device) has a copy of the same chain. The instances (or computing devices) can then independently perform the same operations to determine the leaders of future blocks in the chain.

A peer node 702 or miner device 704 can launch and execute an instance as a standalone application. Alternatively, a peer node 702 or miner device 704 can run an application within which the instance is launched and executed. For example, the application can be a mobile application.

The AMM(s) 708 may perform any of the operations described herein, including operations performed by the AMM 100 or AMM 300. The AMM(s) 708 may collectively form a decentralized exchange. Each AMM 708 may be located in a different geographic region to facilitate asset exchanges originating from these different regions. For example, an AMM 708 can calculate a value of a second type of asset if exchanged a certain amount of a first type of asset (e.g., a relative reserve) periodically and/or in response to a request received from a user device 706 to exchange the certain amount of the first type of asset for the second type of asset. In response to a user device 706 transmitting an indication that the exchange can proceed at the calculated value, the AMM 708 can determine the amount of the second type of asset that results from exchanging the certain amount of the first type of asset at the calculated value, and can initiate the exchange by generating a transaction to be stored on a blockchain or other distributed ledger that identifies the exchange details (e.g., the amount of the second type of asset that would be received in exchange for the certain amount of the first type of asset, the entity that requested the exchange, a date that the exchange was initiated, etc.). The AMM 708 can transmit the transaction to a peer node 702 and/or a miner device 704 for storage in a block in the blockchain or other distributed ledger. Optionally, the AMM 708 can broadcast the transaction to the other AMMs 708 so that each of the other AMMs 708 has a current record of exchanges that are initiated. Thus, each AMM 708 may store a current state of exchanges initiated by user devices 706. The exchange may be complete once the peer node 702 and/or miner device 704 stores the transaction that identifies the exchange details in a block in the blockchain or other distributed ledger.

Figure 8:
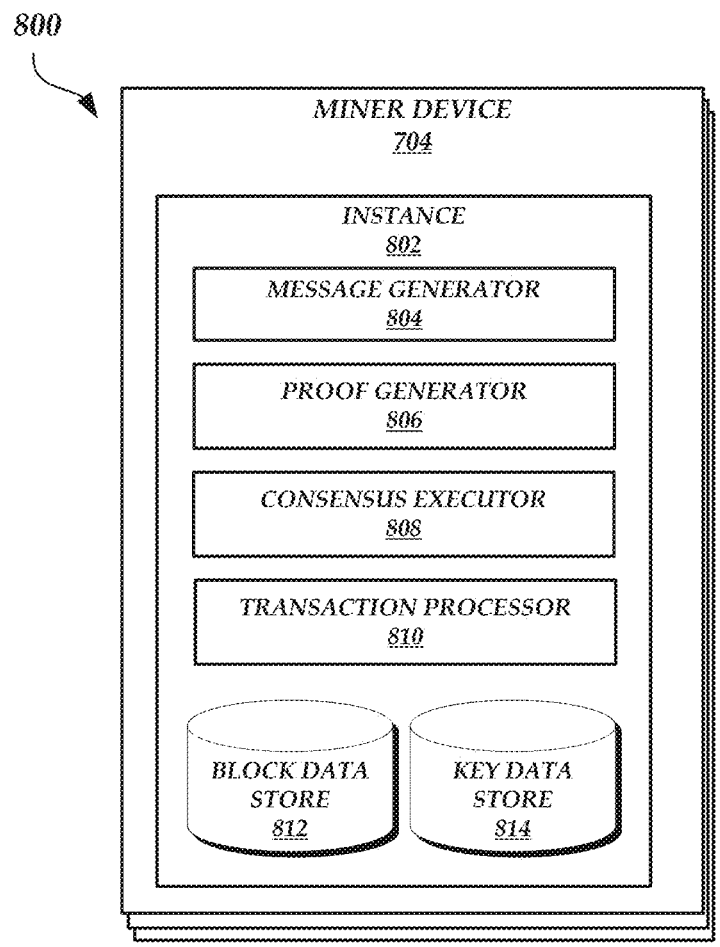
FIG. 8 is a block diagram of an illustrative operating environment that depicts additional details of a miner device.

FIG. 8 is a block diagram of an illustrative operating environment 800 that depicts additional details of a miner device 704. The operating environment 800 includes various miner devices 704, some or all of which may communicate with each other via the network.

As described above, each miner device 704 can launch and execute one or more instances 802. For example, the instance 802 may include a message generator 804, a proof generator 806, a consensus executor 808, a transaction processor 810, a block data store 812, and a key data store 814.

The instance 802 can implement miner functionality as well. For example, the message generator 804 may generate a message that is eventually used to derive a proof for a new block to be added to a blockchain. For example, the message generator 804 may generate the message by hashing a proof present in a previous block in the blockchain (e.g., a block that may become a parent to a new block to be formed in the blockchain).

The proof generator 806 can generate a proof for the new block. For example, the proof generator 806 can obtain a private key from the key data store 818, and can use the message and the obtained private key to generate the proof.

The consensus executor 808 can perform an election to select leaders of new blocks in the blockchain. The consensus executor 808 can use one of several consensus algorithms to select leaders, including proof of work, proof of stake, proof of burn, and/or the like.

The transaction processor 810 can process block rewards received as a result of the instance 802 being selected to form a new block in the blockchain. The transaction processor 810 may also process transaction fees received as a result of the instance 802 being selected to form a new block in the blockchain.

The block data store 812 can store blockchain block data. For example, the block data store 812 can store for each block, an indication of the transactions stored therein. While the block data store 812 is depicted as being internal to the instance 802, this is not meant to be limiting. For example, the block data store 812 may reside internal to the miner device 704, but external to the instance 802. In this example, the instance 802 may share access to the block data store 812.

The key data store 814 can store public and private keys of the instance 802. While the key data store 814 is depicted as being internal to the instance 802, this is not meant to be limiting. For example, the key data store 814 may reside internal to the miner device 704, but external to the instance 802. In this example, the instance 802 may share access to the key data store 814, and the key data store 814 may store public and private keys for each of the instance 802.

While the instance 802 is described herein as implementing the functionality of a miner and a peer, this is not meant to be limiting. For example, the instance 802 can simply implement the functionality of a miner (e.g., not include the consensus executor 808, and/or some of the functionality of the transaction processor 810) and obtain blockchain data from other peer node(s) 702 and/or miner device(s) 704.

Any of the message generator 804, the proof generator 806, the consensus executor 808, the transaction processor 810, the block data store 812, and/or the key data store 814 can communicate with each other such that the appropriate component has access to the data necessary to perform some or all of the operations described herein.

Figure 9:
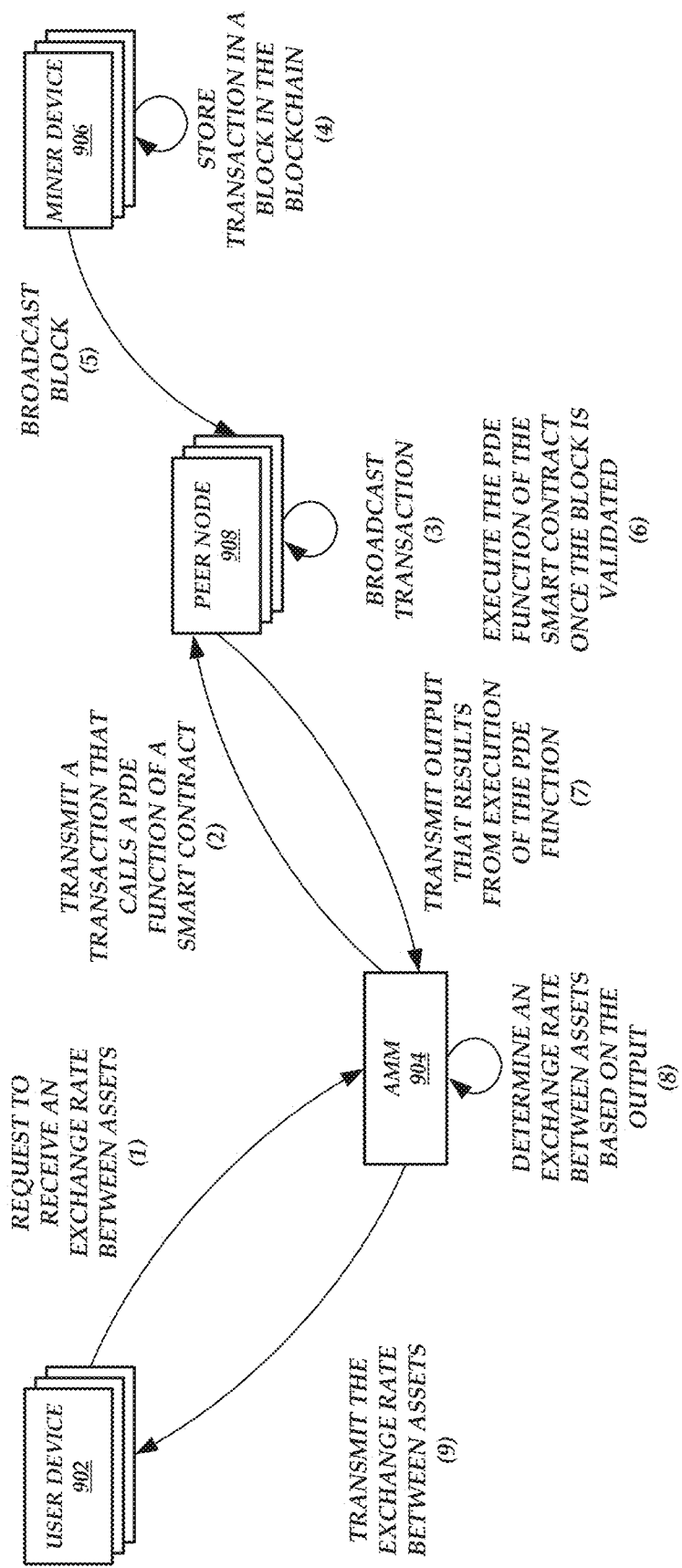
FIG. 9 is a flow diagram illustrating the operations performed by the components of the operating environment of FIG. 7 to execute a PDE by an AMM.

FIG. 9 is a flow diagram illustrating the operations performed by at least some of the components of the operating environment 700 of FIG. 7 to solve for a PDE that calculates a price at which to exchange assets. The operations described with respect to FIG. 9 can also be performed by a miner device 704 and/or a user device 706. As illustrated in FIG. 9, one or more user devices 902 can make a request to the AMM 904 to initiate a transaction to exchange assets at (1). In some examples, the one or more user devices 902 can also request to receive a price of one of the assets with respect to a price of another asset, without initiating a transaction (e.g., a get_price request).

The one or more user devices 902 can request to receive an exchange rate between assets. For example, the one or more user devices 902 can transmit a request to the AMM 904 to perform a transaction involving two assets. The transaction can include an exchange of a first asset to a second asset. Alternatively, the request can include an inquiry about a price of each of the assets. For example, the one or more user devices 902 can execute a software function to obtain a price (e.g., get_price request) that calls the AMM 904 to determine a current exchange rate between the assets. The AMM 904 can receive the request from the one or more user devices 902. The query can take the form of an electronic communication between the one or more user devices 902 and the AMM 904. The AMM 904 can be configured to generate a transaction that calls a PDE function of a smart contract (e.g., a function of a smart contract the source of which was previously stored in a block in a blockchain, where the function, when executed, returns an exchange value or exchange rate between two assets) and transmit the transaction to one or more peer nodes 908 at (2). The call to the PDE function may include one or more arguments, such as a number of units of a first asset to be exchanged, an Oracle price of the first asset, an Oracle price of a second asset to be received in exchange for the first asset, a leverage parameter, and/or any other inputs to the PDE function.

The peer node 908 that receives the transaction may broadcast the transaction to other peer nodes 908 and/or one or more miner devices 906 at (3). A miner device 906 may receive the broadcasted transaction and store the broadcasted transaction and/or zero or more other transactions in a block in the blockchain at (4) (e.g., where the block may be a new block to be added to the blockchain). The miner device 906 can then broadcast the block to one or more peer nodes 908 at (5).

The one or more peer nodes 908 may each validate the block and, once the block is validated, execute the PDE function of the smart contract at (6). For example, the smart contract (e.g., the PDE function of the smart contract) can include executable code to solve a PDE (e.g., the PDE described in FIGS. 2A and 2B). A peer node 908 can retrieve the executable code (which may be referenced by the transaction in the new block) and execute the executable code to execute the PDE function. Alternatively, the AMM 904 can receive and execute the executable code to execute the PDE function. Execution of the PDE function may result in an output that is the exchange value or exchange rate between two assets and/or that can be used to derive the exchange value or exchange rate between two assets. The one or more peer nodes 908 can then transmit the output to the AMM 904 at (7).

The AMM 904 can determine an exchange rate or exchange value between two assets based on the output at (8). For example, the output may be the exchange rate or exchange value or the AMM 904 can derive the exchange rate or exchange value using the output and/or one or more of the factors described herein that affect the exchange rate or exchange value. The AMM 904 can then transmit the exchange rate or exchange value between the assets to the user device 902 at (9) to satisfy the request. The user device 902 may then transmit an instruction to the AMM 904 to initiate the exchange of the two assets if the exchange rate or exchange value is acceptable to the user, as described herein.

Optionally, the one or more user devices 902 can initiate another request to the AMM 904 to solve the PDE for validation purposes. In some examples, to validate the transfer between assets, a liquidity pool of one asset may have one asset amount higher than the other asset. Before completing the asset transfer, the PDE can be again called with inputting the amount that has been transferred and the original relative reserve. In this manner, calling the PDE and by providing what is being transferred, the output may show that the number produced is different than the original asset value when first initiated. In some examples, if there is a different number produced than the original asset value, the difference in values may suggest either a hacking attempt or AMM 904 made a mistake (the AMM 904 having sent more tokens than supposed to). In some examples, if there is a difference between the values, the AMM 904 may revert the transaction.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
under control of a computing device in a decentralized network,
receiving, from a user device, a request to exchange a first amount of a first token for a second token, wherein the first token and the second token have an exchange rate;
receiving an indication of a first relative reserve of the first token, a second relative reserve of the second token, a first dynamic weight, and a second dynamic weight, wherein the first relative reserve is an amount of the first token relative to a price of the first token that is based on a first Oracle value, wherein the second relative reserve is an amount of the second token relative to a price of the second token that is based on a second Oracle value, and wherein the dynamic weight is a deviation measurement between an actual reserve and one of the first relative reserve or the second relative reserve, wherein the first Oracle value and the second Oracle value are received from an Oracle service that provides market values for the first token and the second token;
assigning the first dynamic weight to the first token;
assigning the second dynamic weight to the second token, wherein the first dynamic weight is higher than the second dynamic in response to the first token being underrepresented as compared to the second token;
generating a transaction that calls a partial differential equation function of a smart contract, wherein a call to the partial differential equation function of the smart contract in the transaction comprises as an argument at least one of the first relative reserve, the second relative reserve, the first dynamic weight, or the second dynamic weight, and wherein source code of the smart contract is stored in a first block on a blockchain;
transmitting the transaction to a second computing device in the decentralized network, wherein transmission of the transaction causes the transaction to be stored in a second block on the blockchain, and wherein storage of the transaction in the second block causes the partial differential equation function to be executed to produce an output;
automatically tracking changes in the exchange rate over time in response to calling the partial differential equation function;
receiving the output from the second computing device;

determining a second amount of the second token to be received in exchange for the first amount of the first token;

transmitting an indication of the second amount of the second token to the user device; and autonomously computing a conversion of first amount and second amount.

2. The computer-implemented method of claim 1, further comprising receiving an instruction from the user device to initiate an exchange of the first amount of the first token for the second amount of the second token.

3. The computer-implemented method of claim 2, further comprising:

generating a second transaction that identifies the exchange; and transmitting the second transaction to the second computing device, wherein transmission of the second transaction causes the second transaction to be stored in a third block in the blockchain, and wherein storage of the second transaction in the third block causes the exchange to complete.

4. The computer-implemented method of claim 1, wherein the call to the partial differential equation function of the smart contract in the transaction comprises as an argument at least one of an Oracle price of the first token, and a leverage parameter.

5. The computer-implemented method of claim 1, wherein execution of the partial differential equation function causes a bonding curve to be calculated.

6. The computer-implemented method of claim 5, wherein the partial differential equation function is expressed as:

$$f_{AMM}(x, y, p, s, w) = sw\sqrt{\frac{xy}{p}}(px+y) - 2xysw + xyw$$

wherein x is a relative amount of a first asset, y is a relative amount of a second asset, p is a price of the first asset in terms of the second asset, s is a leverage parameter, and w is a dynamic weight.

7. The computer-implemented method of claim 5, wherein the partial differential equation function is expressed as:

$$f(t_1, t_2, r, c) = c*\sqrt{\frac{t_1 t_2}{p}}(t_1 p + t_2) - 2t_1 t_2 c + t_1 t_2,$$

wherein $t_1$ indicates available liquidity of the first token, wherein $t_2$ indicates available liquidity of the second token, wherein r is the exchange rate between the first token and the second token, wherein c is a slippage rate, and wherein the exchange rate r is set to one in response to an indication that no exchange rate r is known.

8. The computer-implemented method of claim 5, wherein the partial differential equation function is expressed as:

$$f_2(x_0, y_0, W_{weight}, W_{factor}) = x_0^{W_{weight}} y_0 + x_0 y_0^{W_{factor} W_{weight}}.$$

9. The computer-implemented method of claim 5, wherein the partial differential equation function is expressed as:

$$f_{newFunction}(x_0, y_0, V) = x_0 y_0 (1 + y_0^{0.5} + V x_0^{0.5} y_0).$$

10. The computer-implemented method of claim 1, wherein operations of the partial differential equation function are non-recursive.

11. The computer-implemented method of claim 1, wherein the computing device comprises an Automated Market Maker (AMM).

12. An automated market maker (AMM) computing device comprising:

a network interface configured to couple the AMM computing device to a decentralized network;

a non-transitory computer readable storage medium storing program instructions; and a hardware processor, wherein the program instructions, when executed by the hardware processor, cause the AMM computing device to:

receive, from a user device, a request to exchange a first amount of a first token for a second token, wherein the first token and the second token have an exchange rate;

receive an indication of a first relative reserve of the first token, a second relative reserve of the second token, a first dynamic weight, and a second dynamic weight, wherein the first relative reserve is an amount of the first token relative to a price of the first token that is based on a first Oracle value, wherein the second relative reserve is an amount of the second token relative to a price of the second token that is based on a second Oracle value, and wherein the dynamic weight is a deviation measurement between an actual reserve and one of the first relative reserve or the second relative reserve, wherein the first Oracle value and the second Oracle value are received from an Oracle service that provides market values for the first token and the second token;

assign the first dynamic weight to the first token;

assign the second dynamic weight to the second token, wherein the first dynamic weight is higher than the second dynamic in response to the first token being underrepresented as compared to the second token;

generate a transaction that calls a partial differential equation function of a smart contract, wherein a call to the partial differential equation function of the smart contract in the transaction comprises as an argument at least one of the first relative reserve, the second relative reserve, the first dynamic weight, or the second dynamic weight, and wherein source code of the smart contract is stored in a first block on a blockchain;

transmit the transaction to a second computing device in the decentralized network, wherein transmission of the transaction causes the transaction to be stored in a second block on the blockchain, and wherein storage of the transaction in the second block causes the partial differential equation function to be executed to produce an output;

automatically track changes in the exchange rate over time in response to calling the partial differential equation function;

receive the output from the second computing device;

determine a second amount of the second token to be received in exchange for the first amount of the first token;

transmit an indication of the second amount of the second token to the user device; and autonomously compute a conversion of first amount and second amount.

13. The AMM computing device of claim 12, wherein the program instructions, when executed, further cause the AMM computing device to receive an instruction from the user device to initiate an exchange of the first amount of the first token for the second amount of the second token.

14. The AMM computing device of claim 13, wherein the program instructions, when executed, further cause the AMM computing device to:
generate a second transaction that identifies the exchange; and
transmit the second transaction to the second computing device, wherein transmission of the second transaction causes the second transaction to be stored in a third block in the blockchain, and wherein storage of the second transaction in the third block causes the exchange to complete.

15. The AMM computing device of claim 12, wherein the call to the partial differential equation function of the smart contract in the transaction comprises as an argument at least one of an Oracle price of the first token, or a leverage parameter.

16. The AMM computing device of claim 12, wherein the partial differential equation function is expressed as:

$$f_{AMM}(x, y, p, s, w) = sw\sqrt{\frac{xy}{p}}(px+y) - 2xysw + xyw$$

wherein x is a relative amount of a first asset, y is a relative amount of a second asset, p is a price of the first asset in terms of the second asset, s is a leverage parameter, and w is a dynamic weight.

17. The AMM computing device of claim 12, wherein the partial differential equation function is expressed as:

$$f(t_1, t_2, r, c) = c*\sqrt{\frac{t_1 t_2}{p}}(t_1 p + t_2) - 2t_1 t_2 c + t_1 t_2,$$

wherein $t_1$ indicates available liquidity of the first token, wherein $t_2$ indicates available liquidity of the second token, wherein r is the exchange rate between the first token and the second token, wherein c is a slippage rate, and wherein the exchange rate r is set to one in response to an indication that no exchange rate r is known.

18. The AMM computing device of claim 12, wherein the partial differential equation function is expressed as:

$$f_2(x_0, y_0, W_{weight}, W_{factor}) = x_0^{Wweight} y_0 + x_0 y_0^{WfactorWweight}.$$

19. The AMM computing device of claim 12, wherein the partial differential equation function is expressed as:

$$f_{newFunction}(x_0, y_0, V) = x_0 y_0 (1 + y_0^{0.5} + V x_0^{0.5} y_0).$$

20. A non transitory, computer-readable storage medium comprising computer-executable instructions for exchanging cryptocurrency, wherein the computer-executable instructions, when executed by a computer device, cause the computer device to:
receive, from a user device, a request to exchange a first amount of a first token for a second token, wherein the first token and the second token have an exchange rate;
receive an indication of a first relative reserve of the first token, a second relative reserve of the second token, a first dynamic weight, and a second dynamic weight, wherein the first relative reserve is an amount of the first token relative to a price of the first token that is based on a first Oracle value, wherein the second relative reserve is an amount of the second token relative to a price of the second token that is based on a second Oracle value, and wherein the dynamic weight is a deviation measurement between an actual reserve and one of the first relative reserve or the second relative reserve, wherein the first Oracle value and the second Oracle value are received from an Oracle service that provides market values for the first token and the second token;
assign the first dynamic weight to the first token;
assign the second dynamic weight to the second token, wherein the first dynamic weight is higher than the second dynamic in response to the first token being underrepresented as compared to the second token;
generate a transaction that calls a partial differential equation function of a smart contract, wherein a call to the partial differential equation function of the smart contract in the transaction comprises as an argument at least one of the first relative reserve, the second relative reserve, the first dynamic weight, or the second dynamic weight, and wherein source code of the smart contract is stored in a first block on a blockchain;
transmit the transaction to a second computing device in a decentralized network, wherein transmission of the transaction causes the transaction to be stored in a second block on the blockchain, and wherein storage of the transaction in the second block causes the partial differential equation function to be executed to produce an output;
automatically track changes in the exchange rate over time in response to calling the partial differential equation function;
receive the output from the second computing device;
determine a second amount of the second token to be received in exchange for the first amount of the first token;
transmit an indication of the second amount of the second token to the user device; and
autonomously compute a conversion of first amount and second amount.

* * * * *